(12) United States Patent
Takada et al.

(10) Patent No.: US 11,262,491 B2
(45) Date of Patent: Mar. 1, 2022

(54) POLARIZING PLATE HAVING ALTERNATELY STACKED LAYERS HAVING DIFFERENT DEPOSITION DIRECTIONS

(71) Applicant: Dexerials Corporation, Shinagawa-ku (JP)

(72) Inventors: Akio Takada, Shinagawa-ku (JP); Eiji Takahashi, Shinagawa-ku (JP); Nobuyuki Koike, Shinagawa-ku (JP); Koji Sasaki, Shinagawa-ku (JP)

(73) Assignee: Dexerials Corporation, Shinagawa-ku (JP)

( * ) Notice: Subject to any disclaimer, the term of this patent is extended or adjusted under 35 U.S.C. 154(b) by 0 days.

(21) Appl. No.: 16/675,777

(22) Filed: Nov. 6, 2019

(65) Prior Publication Data

US 2020/0142118 A1    May 7, 2020

Related U.S. Application Data

(62) Division of application No. 14/904,337, filed as application No. PCT/JP2014/068600 on Jul. 11, 2014, now Pat. No. 10,732,335.

(30) Foreign Application Priority Data

Jul. 11, 2013  (JP) ................ 2013-145107

(51) Int. Cl.
  *G02B 5/30*     (2006.01)
  *G02F 1/1335*   (2006.01)
  *G02B 5/18*     (2006.01)

(52) U.S. Cl.
  CPC ......... *G02B 5/3041* (2013.01); *G02B 5/3008* (2013.01); *G02B 5/3058* (2013.01); *G02B 5/1809* (2013.01); *G02F 1/133548* (2021.01)

(58) Field of Classification Search
  CPC .......... G02B 5/003; G02B 5/021–0226; G02B 5/0236–0247; G02B 5/0268–0294;
  (Continued)

(56) References Cited

U.S. PATENT DOCUMENTS

| | | | |
|---|---|---|---|
| 6,214,471 | B1 | 4/2001 | Beall et al. |
| 6,772,608 | B1 | 8/2004 | Drost et al. |

(Continued)

FOREIGN PATENT DOCUMENTS

| | | |
|---|---|---|
| CN | 102834750 A | 12/2012 |
| JP | 2000-147253 A | 5/2000 |

(Continued)

OTHER PUBLICATIONS

Kazutaka Baba, et al., "Anisotropic optical media from laminated island films: theory", J. Opt. Soc. Am. A, vol. 8, No. 4, pp. 619-624, (Apr. 1991).

(Continued)

*Primary Examiner* — Ryan S Dunning
(74) *Attorney, Agent, or Firm* — Oblon, McClelland, Maier & Neustadt, L.L.P.

(57) ABSTRACT

Provided are a polarizing plate having excellent optical characteristics, and a method for manufacturing the polarizing plate. The present invention is provided with: a translucent substrate through which light passes in a working band; a bundle structure layer constituted of a columnar sheaf comprising one or more material from among dielectrics, metals, and semiconductors, the bundle structure layer being formed on the translucent substrate; an absorption layer formed on the bundle structure layer; a dielectric layer formed on the absorption layer; and a reflection layer formed on the dielectric layer and arranged as a one-dimensional lattice at a pitch that is smaller than the wavelength of the light in the working band. Because the bundle structure layer (Continued)

increases light absorption and light scattering, the result is that reflectivity can be reduced and excellent optical characteristics obtained.

1 Claim, 39 Drawing Sheets

(58) Field of Classification Search
CPC ........ G02B 5/1809; G02B 5/22; G02B 5/223;
G02B 5/30; G02B 5/3008; G02B 5/3025;
G02B 5/3033; G02B 5/3041; G02B
5/305; G02B 5/3058; G02F 1/0136; G02F
1/133528; G02F 2001/133545; G02F
2001/133548; G02F 1/13362; G02F
2201/08
USPC ........ 349/9, 96; 359/487.01, 487.03, 487.05,
359/487.06, 614, 615, 885; 427/163.1
See application file for complete search history.

(56) References Cited

U.S. PATENT DOCUMENTS

| RE45,642 E | 8/2015 | Takada | |
|---|---|---|---|
| 2009/0290105 A1 | 11/2009 | Takada | |
| 2010/0225886 A1* | 9/2010 | Kumai | G02B 5/3058 |
| | | | 353/20 |
| 2011/0007255 A1 | 1/2011 | Yaroshchuk et al. | |
| 2011/0102712 A1* | 5/2011 | Kumai | G02B 7/008 |
| | | | 349/96 |
| 2012/0127404 A1 | 5/2012 | Takada | |
| 2012/0295069 A1 | 11/2012 | Koike | |
| 2013/0135727 A1 | 5/2013 | Takada et al. | |
| 2013/0286358 A1 | 10/2013 | Takahashi et al. | |

FOREIGN PATENT DOCUMENTS

| JP | 2002-372620 | | 12/2002 |
|---|---|---|---|
| JP | 2002-372620 | A | 12/2002 |
| JP | 2008-216957 | A | 9/2008 |
| JP | 2009-282437 | A | 12/2009 |
| JP | 2010-530994 | A | 9/2010 |
| JP | 2011-039351 | | 2/2011 |
| JP | 2011-514983 | A | 5/2011 |
| JP | 2012/118204 | A1 | 9/2012 |
| JP | 2012-189773 | A | 10/2012 |
| JP | 2012-242449 | | 12/2012 |
| JP | 2012-256024 | A | 12/2012 |
| WO | WO2009/106208 | A1 | 9/2009 |
| WO | 2011/148465 | A1 | 12/2011 |
| WO | WO2011/162331 | | 12/2011 |

OTHER PUBLICATIONS

Kazuo Shiraishi, et al., "Microisolator", Applied Optics, vol. 25, No. 2, pp. 311-314, (Jan. 15, 1986).

Kazuo Shiraishi, et al., "Laminated Polarizers Exhibiting High Performance Over a Wide Range of Wavelength", Journal of Lightwave Technology, vol. 15, No. 6, pp. 1042-1050, (Jun. 1997).

International Search Report dated Oct. 14, 2014 in PCT/JP14/068600 Filed Jul. 11, 2014.

Office Action dated Mar. 20, 2018 in Japanese Patent Application No. 2016-245379 (with unedited computer generated English translation), 6 pages.

Notice of Reasons for Refusal dated Mar. 19, 2019, in corresponding Japanese Patent Application No. 2018-089712 (with English-language Translation).

Notice of Reasons for Refusal dated Mar. 19, 2019, in corresponding Japanese Patent Application No. 2018-089713 (with English-language Translation).

Combined Office Action and Search Report dated Dec. 4, 2017 in Chinese Patent Application No. 201480039577.1 (with English translation of categories of cited documents), 14 pages.

Office Action dated Jan. 24, 2017 in Japanese Patent Application No. 2014-143085 (with English translation).

* cited by examiner

POLARIZING PLATE HAVING ALTERNATELY STACKED LAYERS HAVING DIFFERENT DEPOSITION DIRECTIONS

This application is a Divisional of U.S. application Ser. No. 14/904,337 filed on Jan. 11, 2016, which is a National Stage of application PCT/JP14/68600, filed on Jul. 11, 2014.

TECHNICAL FIELD

The present invention relates to a polarizing plate that absorbs one of polarized components (P-polarized wave and S-polarized wave) orthogonal to each other and transmits the other, and a method for manufacturing a polarizing plate. It also relates to a method for manufacturing a bundle structure suitable for polarizing plate use.

BACKGROUND ART

The image forming principle of liquid crystal display apparatuses requires a polarizing plate be placed on a liquid crystal panel surface. The function of a polarizing plate is to absorb one of polarized components (P-polarized wave and S-polarized wave) that are orthogonal to each other and transmit the other.

Heretofore, dichroic polarizing plates formed of films containing iodine-based or dye-based polymer organic substances have been widely used as the above-described polarizing plate. A typical manufacturing method therefor involves dyeing a polyvinyl alcohol film with a dichroic material such as iodine, performing crosslinking using a crosslinking agent, and uniaxially stretching the resulting product. Since manufacturing of dichroic polarizing plates involves stretching as such, dichroic polarizing plates are usually readily shrinkable. A polyvinyl alcohol film is readily deformable particularly under humid conditions since a hydrophilic polymer is used. Basically, because a film is used, mechanical strength of a device is low and it may be necessary to bond a transparent protective film thereto.

In recent years, usage of liquid crystal display apparatuses has expanded and functions of liquid crystal display apparatuses have become more sophisticated. Under such a trend, individual devices that constitute a liquid crystal display apparatus are required to achieve high reliability and durability. For example, a polarizing plate of a liquid crystal display apparatus, such as a transmission-type liquid crystal projector, that uses a light source with high light intensity receives intense radiation. Thus polarizing plates for use in such apparatuses need to have excellent heat resistance. However, since film-based polarizers such as the one described above are formed of organic substances, there is naturally a limit to enhancing these properties.

In the United States, Corning Incorporated sells a highly heat resistant inorganic polarizing plate under the trade name of Polarcor. This polarizing plate is configured by dispersing silver fine particles in glass and does not use organic substances such as films. The principle is to utilize plasmon resonance of island-like fine particles. That is, light absorption by surface plasmon resonance induced by light incident on island-like fine particles of a noble metal or a transition metal is utilized where the absorption wavelength is dependent on the shape of the particles and the dielectric constant of the surroundings. When the island-like fine particles have an elliptical shape, the resonance wavelengths in the major axis direction and in the minor axis direction differ from each other, creating a polarization property; specifically, a polarization property is obtained in which a polarized component parallel to the major axis on the long wavelength side is absorbed and a polarized component parallel to the minor axis is transmitted. However, the wavelength range in which Polarcor exhibits a polarization property is a range near an infrared zone and does not cover the visible light range as required by liquid crystal display apparatuses. This is due to the physical properties of silver used in island-like fine particles.

PTL 1 describes a UV polarizing plate that applies the principle described above, which is obtained by precipitating fine particles in glass by thermal reduction, and teaches the use of silver as metal fine particles. Presumably, this polarizing plate utilizes absorption in the minor axis direction unlike Polarcor. As illustrated in FIG. 1, the polarizing plate functions at about 400 nm but the extinction ratio is small and the range that absorption can occur is very narrow; thus, even if the technology of PTL 1 is combined with Polarcor, the resulting polarizing plate will not cover the entire visible light range.

NPL 1 provides theoretical analysis of an inorganic polarizing plate that utilizes plasmon resonance of island-like metal fine particles. According to this document, aluminum fine particles have a resonance wavelength about 200 nm shorter than that of silver fine particles and there is a possibility that a polarizing plate that covers the visible light range can be obtained by using aluminum fine particles.

PTL 2 describes several methods for manufacturing polarizing plates using aluminum fine particles. It is described in PTL 2 that silicate-based glass is not preferable as a substrate since aluminum and glass react with each other, and that calcium-aluminoborate glass is suitable (paragraphs 0018 and 0019). However, silicate glass is widely available as optical glass and highly reliable products can be purchased at low cost. It would be economically disadvantageous if silicate glass were not suitable. PTL 2 also describes a method for forming island-like particles by etching a resist pattern (paragraphs 0037 and 0038). In general, a polarizing plate used in a projector needs to be about several centimeters in size and have a high extinction ratio. Accordingly, for a visible light polarizing plate, the resist pattern size needs to be sufficiently shorter than a visible light wavelength, that is, the resist pattern needs to be several tens of nanometers in size. Moreover, in order to obtain a high extinction ratio, the pattern needs to have a high density. When the polarizing plate is for projector use, the pattern needs to have a large area. However, the method described applies high-density fine pattern formation by lithography, and electron beam lithography, for example, must be used to obtain such a pattern. Electron beam lithography is a method in which individual patterns are drawn by an electron beam, and is unpractical due to its low productivity.

PTL 2 also describes that aluminum is removed by a chlorine plasma; however, when etching is performed as such, chlorides usually deposit on the side walls of an aluminum pattern. Although chlorides can be removed by using a commercially available wet-etching solution (for example, SST-A2 produced by TOKYO OHKA KOGYO CO., LTD.), a chemical that reacts with aluminum chlorides also reacts with aluminum however low the etching rate, and thus it is difficult to obtain a desired pattern shape by the described method.

PTL 2 describes another method that involves depositing aluminum on a patterned photoresist by oblique film formation and removing the photoresist (paragraphs 0045 and 0047). However, according to this method, it is presumably necessary to deposit some aluminum on the substrate surface in order to obtain adhesion between the substrate and aluminum. This means that the shape of the aluminum film is different from the appropriate shape described in paragraph 0015, namely, elongated spheres including prolate spheroids. Moreover, paragraph 0047 describes that an over-deposited portion is removed by performing anisotropic etching perpendicular to the surface. The shape anisotropy of aluminum is extremely important in order for a polarizing plate to function. Accordingly, it is presumably necessary to adjust the amounts of aluminum deposited on the resist portion and the substrate surface so that a desired shape can be obtained by etching; however, paragraph 0047 describes that the size of the aluminum deposits is controlled on the scale smaller than one tenth of a micrometer, namely, 0.05 µm, which is extremely difficult, and whether this process is suitable for a high-productivity manufacturing method is doubtful. Moreover, a polarizing plate is required to have a high transmittance in the transmission axis direction, but a substrate formed of glass inevitably reflects several percent of light at the glass interface, and rarely achieves high transmittance.

PTL 3 describes a planarizing plate obtained by oblique deposition. According to this method, fine columnar structures are manufactured by obliquely depositing transparent and opaque substances relative to the wavelength of the working band to obtain a polarization property. Unlike PTL 1, this method is considered highly productive since fine patterns can be obtained by a simple method. The aspect ratio of the fine columnar structures formed of an opaque substance relative to the working band, and the intervals and straightness of the individual fine columnar structures are important factors for obtaining a good polarization property and should be intentionally controlled also from the viewpoint of reproducibility of properties. However, in order to obtain columnar structures, this method takes advantage of a phenomenon that vapor deposition particles do not deposit on portions shadowed by previously deposited layers of vapor deposition particles; thus, it is difficult to intentionally control the above-described features. The document also describes a method for improvement which involves forming polishing marks on a substrate by conducting rubbing treatment prior to vapor deposition; however, the particle diameter of a vapor-deposited film is generally about several tens of nanometers at maximum and pitches smaller than one tenth of a micrometer need to be intentionally formed by polishing in order to control the anisotropy of such particles. However, a typical polishing sheet or the like can form polishing marks on the scale of one tenth of a micrometer at the smallest, and fine polishing marks such as those described above cannot be easily manufactured. As discussed above, the resonance wavelength of Al fine particles is strongly dependent on the refractive index of the surroundings, and the combination of transparent and opaque substances is important in such a case. However, PTL 3 does not describe a combination for obtaining good polarization property in the visible light range. Furthermore, as in PTL 1, several percent of light is inevitably reflected by the glass interface if glass is used to form a substrate.

NPL 2 describes a polarizing plate, known as Lamipol, for infrared communication. This polarizing plate has an Al/SiO$_2$ laminated structure, and exhibits a very high extinction ratio according to this document. NPL 3 also describes that using Ge instead of Al that contributes to light absorption of Lamipol achieves a high extinction ratio at a wavelength of 1 µm or less. It is also expected that a high extinction ratio can be obtained with Te (tellurium) from FIG. 3 of the same document. While Lamipol is an absorption-type polarizing plate that can achieve a high extinction ratio, the thickness of the laminate constituted by a light-absorbing substance and a light-transmitting substance defines the size of the light-receiving surface and Lamipol is not suitable for projector use that requires a polarizing plate with sides of several centimeters.

PTL 4 describes a polarizing plate in which a wire grid structure and an absorption film are combined. When a metal or semiconductor film is used for the absorption film, optical characteristics of the material strongly affect the properties of the absorption film. It is possible to decrease the reflectance of a particular range by changing the material and the thickness of a dielectric film between the wire grid and the absorption film; however, this cannot be easily achieved throughout a wide wavelength range.

While the band can be expanded by using Ta, Ge, or other element that has high absorption, absorption in the transmission axis direction increases simultaneously, resulting in a decrease in transmittance in the transmission axis direction, which is an important property for polarizing plates.

The issues described above can be addressed by using fine particles in the absorption film. However, the methods so far proposed for directly depositing an absorption film by oblique deposition rely on self-assembly of the absorption film to be deposited by shadowing; thus, the method is affected by the physical properties of the material and roughness of the substrate and it is difficult to control absorption characteristics.

CITATION LIST

Patent Literature

PTL 1: U.S. Pat. No. 6,772,608
PTL 2: Japanese Unexamined Patent Application Publication No. 2000-147253
PTL 3: Japanese Unexamined Patent Application Publication No. 2002-372620
PTL 4: Japanese Unexamined Patent Application Publication No. 2008-216957

Non Patent Literature

NPL 1: J. Opt. Soc. Am. A Vol. 8, No. 4 619-624
NPL 2: Applied Optics Vol. 25 No. 21986 311-314
NPL 3: J. Lightwave Tec. Vol. 15 No. 6 1997 1042-1050

SUMMARY OF INVENTION

Technical Problem

The present invention has been proposed under such circumstances and aims to provide a polarizing plate having excellent optical characteristics and a method for manufacturing a polarizing plate.

Solution to Problem

To solve the problem described above, a polarizing plate according to the present invention includes a translucent substrate that transmits light in a working band, a bundle structure layer disposed on the translucent substrate and constituted by a columnar sheaf formed of at least one selected from a dielectric, a metal, and a semiconductor, an absorption layer disposed on the bundle structure layer, a dielectric layer disposed on the absorption layer, and a reflection layer disposed on the dielectric layer and arranged in a one-dimensional lattice at a pitch smaller than a wavelength of light in the working band.

Another polarizing plate according to the present invention includes a translucent substrate that transmits light in a working band, a bundle structure layer disposed on the translucent substrate and constituted by a columnar sheaf formed of at least one selected from a dielectric, a metal, and a semiconductor, and an absorption layer disposed on the bundle structure layer.

Another polarizing plate according to the present invention includes a translucent substrate that transmits light in a working band, an absorption layer disposed on the translucent substrate, and a bundle structure layer disposed on the absorption layer and constituted by a columnar sheaf formed of at least one selected from a dielectric, a metal, and a semiconductor, in which the absorption layer includes inorganic fine particles.

Another polarizing plate according to the present invention includes a translucent substrate that transmits light in a working band, a reflection layer disposed on the translucent substrate and arranged in a one-dimensional lattice at a pitch smaller than a wavelength of light in the working band, a bundle structure layer disposed on the reflection layer and constituted by a columnar sheaf formed of at least one selected from a dielectric, a metal, and a semiconductor, and an absorption layer disposed on the bundle structure layer.

Another polarizing plate according to the present invention includes a translucent substrate that transmits light in a working band, a reflection layer disposed on the translucent substrate and arranged in a one-dimensional lattice at a pitch smaller than a wavelength of light in the working band, a dielectric layer disposed on the reflection layer, a bundle structure layer disposed on the dielectric layer and constituted by a columnar sheaf formed of at least one selected from a dielectric, a metal, and a semiconductor, and an absorption layer disposed on the bundle structure layer.

Another polarizing plate according to the present invention includes a translucent substrate that transmits light in a working band, and a bundle structure layer disposed on the translucent substrate and constituted by a columnar sheaf formed of at least one selected from a dielectric, a metal, and a semiconductor, in which the bundle structure layer includes at least one layer formed of a metal or a semiconductor.

Another polarizing plate according to the present invention includes a translucent substrate that transmits light in a working band, and a bundle structure layer disposed on the translucent substrate and constituted by a columnar sheaf formed of an oxide, in which the oxide is oxygen-deficient.

Another polarizing plate according to the present invention includes a translucent substrate that transmits light in a working band, a bundle structure layer disposed on the translucent substrate, constituted by a columnar sheaf formed of at least one selected from a dielectric, a metal, and a semiconductor, and having optical anisotropy, a dielectric layer disposed on the bundle structure layer, and a reflection layer disposed on the dielectric layer and arranged in a one-dimensional lattice at a pitch smaller than a wavelength of light in the working band.

A method for manufacturing a polarizing plate according to the present invention includes forming an absorption layer and a bundle structure layer sequentially in that order on a translucent substrate, the bundle structure layer being constituted by a columnar sheaf formed of at least one selected from a dielectric, a metal, and a semiconductor; and etching the absorption layer into a fine particle form by using the bundle structure layer as a mask.

Another method for manufacturing a polarizing plate according to the present invention includes forming a bundle structure layer on a translucent substrate, the bundle structure layer being constituted by a columnar sheaf formed of an oxide; and reducing the bundle structure layer.

Another method for manufacturing a polarizing plate according to the present invention includes placing nanoparticles on a substrate, the nanoparticles having a diameter smaller than a wavelength of a working band, and obliquely depositing inorganic fine particles alternately in two directions 180° different from each other on an xy plane which is a substrate surface in an xyz orthogonal coordinate system.

Another method for manufacturing a polarizing plate according to the present invention includes obliquely depositing inorganic fine particles alternately in two directions 180° different from each other on an xy plane which is a substrate surface in an xyz orthogonal coordinate system, so as to form a bundle structure layer, and then performing ion etching in a direction orthogonal to a straight line on the xy plane, the straight line extending in the two directions 180° different from each other.

Advantageous Effects of Invention

According to the present invention, since the bundle structure layer constituted by a columnar sheaf formed of at least one selected from a dielectric, a metal, and a semiconductor enhances light absorption and light scattering, the reflectance can be decreased and excellent optical characteristics can be obtained as a result.

DESCRIPTION OF EMBODIMENTS

Figure 1A:
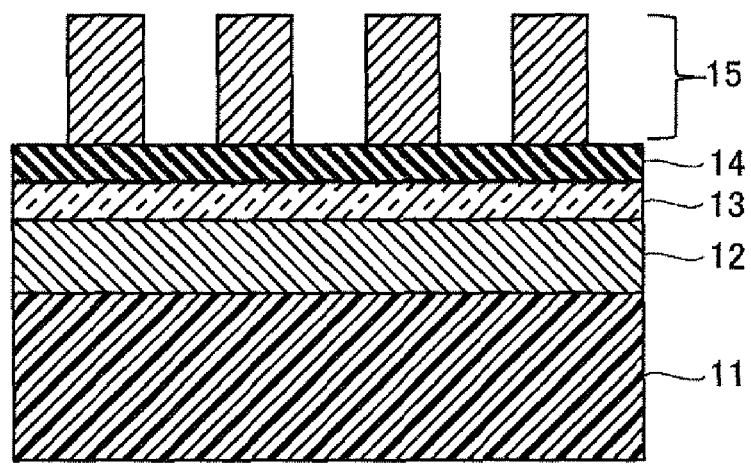
FIG. 1A is a schematic cross-sectional view of a polarizing plate of Structural Example 1 and FIG. 1B is a schematic cross-sectional view of a polarizing plate of Structural Example 2.

Embodiments of the present invention are described in detail below in the following order with reference to the drawings:
1. Structure of polarizing plate
2. Method for manufacturing polarizing plate
3. Examples 1. Polarizing Plate A polarizing plate according to an embodiment includes a bundle structure layer constituted by a columnar sheaf formed of at least one selected from a dielectric, a metal, and a semiconductor, and the bundle structure layer increases light absorption and light scattering; thus, the polarizing plate obtains a decreased reflectance and excellent optical characteristics.

In this description and graphs of optical characteristics indicated in the drawings, Tp represents a transmittance for linearly polarized light in the x axis direction (transmission axis transmittance), Ts represents a transmittance for linearly polarized light in the y axis direction (absorption axis transmittance), Rp represents a reflectance for linearly polarized light in the x axis direction (transmission axis reflectance), and Rs represents a reflectance for linearly polarized light in the y axis direction (absorption axis reflectance).

First Embodiment

Figure 1B:
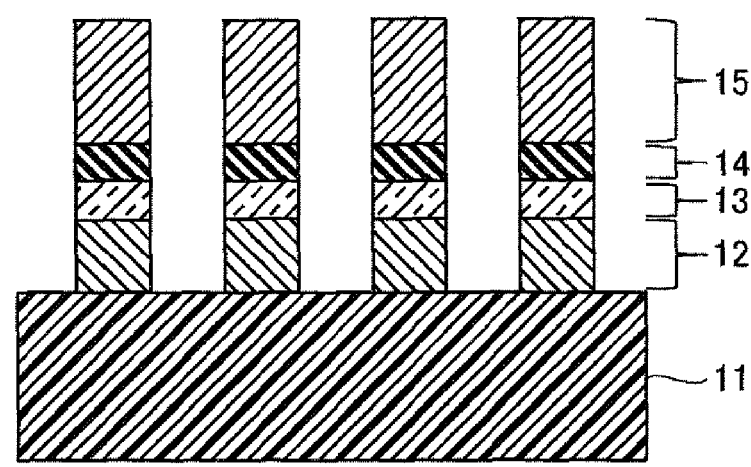

FIG. 1A is a schematic cross-sectional view of a polarizing plate of Structural Example 1. FIG. 1B is a schematic cross-sectional view of a polarizing plate of Structural Example 2.

The polarizing plate of Structural Example 1 illustrated in FIG. 1A includes a translucent substrate 11 that transmits light in the working band, a bundle structure layer 12 disposed on the translucent substrate 11 and constituted by a columnar sheaf formed of at least one selected from a dielectric, a metal, and a semiconductor, an absorption layer 13 disposed on the bundle structure layer 12, a dielectric layer 14 disposed on the absorption layer 13, and a reflection layer 15 disposed on the dielectric layer 14 and arranged in a one-dimensional lattice at a pitch smaller than the wavelength of light in the working band.

Preferably, at least one selected from the bundle structure layer 12, the absorption layer 13, and the dielectric layer 14 is also arranged in a one-dimensional lattice at a pitch smaller than the wavelength of light in the working band as with the reflection layer 15.

More preferably, all of the bundle structure layer 12, the absorption layer 13, and the dielectric layer 14 are arranged in a one-dimensional lattice at a pitch smaller than the wavelength of light in the working band as with the reflection layer 15. A preferable example thereof is a polarizing plate of Structural Example 2 illustrated in FIG. 1B in which the polarizing plate includes a translucent substrate 11 that transmits light in the working band, a bundle structure layer 12 disposed on the translucent substrate 11 and constituted by a columnar sheaf formed of at least one selected from a dielectric, a metal, and a semiconductor, an absorption layer 13 disposed on the bundle structure layer 12, a dielectric layer 14 disposed on the absorption layer 13, and a reflection layer 15 disposed on the dielectric layer 14, and the bundle structure layer 12, the absorption layer 13, the dielectric layer 14, and the reflection layer 15 are arranged in a one-dimensional lattice. In other words, this polarizing plate has a one-dimensional lattice wire grid structure constituted by protrusions aligned on the translucent substrate 11 at particular intervals, and each of the protrusions is constituted by the bundle structure layer 12, the absorption layer 13, the dielectric layer 14, and the reflection layer 15 stacked in that order from the translucent substrate 11 side. When the transmission axis transmittance of the bundle structure layer 12 is high and desired optical characteristics are obtained, the bottom of recesses of the wire grid structure may be the bundle structure layer 12 instead of the translucent substrate 11. Alternatively, the translucent substrate 11 may be etched to form grooves if this is convenient for the process.

When at least one layer selected from the bundle structure layer 12, the absorption layer 13, and the dielectric layer 14 is arranged in a one-dimensional lattice at a pitch smaller than the wavelength of light in the working band as with the reflection layer 15, contrast (extinction ratio: transmission axis transmittance/absorption axis transmittance) can be improved.

The translucent substrate 11 is formed of a material that is transparent for light in the working band and has a refractive index of 1.1 to 2.2, e.g., glass, sapphire, or rock crystal. In this embodiment, a rock crystal or sapphire substrate having high heat conductivity is preferably used as the material for the translucent substrate 11. Such a polarizing plate exhibits high light fastness for intense light and is useful as a polarizing plate of an optical engine of a projector that generates a large quantity of heat.

When the translucent substrate 11 is formed of a birefringent crystal such as rock crystal, the protrusions are arranged in a lattice in a direction parallel or perpendicular to the optical axis of the crystal so as to obtain excellent optical characteristics. In birefringent crystals, the optical axis is in the direction of incident light that does not split into an ordinary ray (0) and an extraordinary ray (E).

Glass, in particular, quartz (refractive index: 1.46) or soda-lime glass (refractive index: 1.51), may be used depending on the usage of the polarizing plate. The composition of the glass material is not particularly limited. Inexpensive glass materials such as silicate glass widely available as optical glass can be used, for example, so as to cut the manufacturing cost.

The bundle structure layer 12 is constituted by a columnar sheaf formed of at least one selected from a dielectric, a metal, and a semiconductor, and is formed by stacking inorganic fine particles formed of at least one selected from a dielectric, a metal, and a semiconductor by oblique deposition or oblique sputtering. The dielectric is preferably an oxide containing at least one selected from Ta, Si, Ti, Al, Mg, La, Zr, and Nb. Specific examples of the oxide include $Ta_2O_5$, $SiO_2$, $TiO_2$, $Al_2O_3$, MgO, $CeO_2$, $ZrO_2$, ZrO, and $Nb_2O_5$.

A substance, such as a metal material or a semiconductor material, that has a non-zero extinction coefficient as an optical constant and thus has a light-absorbing ability may also be used. Examples of the metal material include Ta, Al, Ag, Cu, Au, Mo, Cr, Ti, W, Ni, Fe, and Sn as either a single element or an alloy. Examples of the semiconductor material include Si, Ge, Te, ZnO, and silicide materials ($\beta$-$FeSi_2$, $MgSi_2$, $NiSi_2$, $BaSi_2$, $CrSi_2$, $C_OSi_2$, and TaSi). A mixed material containing a semiconductor material and a metal material, such as a mixed material containing Si and Fe, for example, may also be used. Due to the light absorption anisotropy exhibited by the metal material and the semiconductor material and the light absorption anisotropy derived from stacking of inorganic fine particles, the light absorption anisotropy of the bundle structure layer 12 can be enhanced.

Figure 2A:
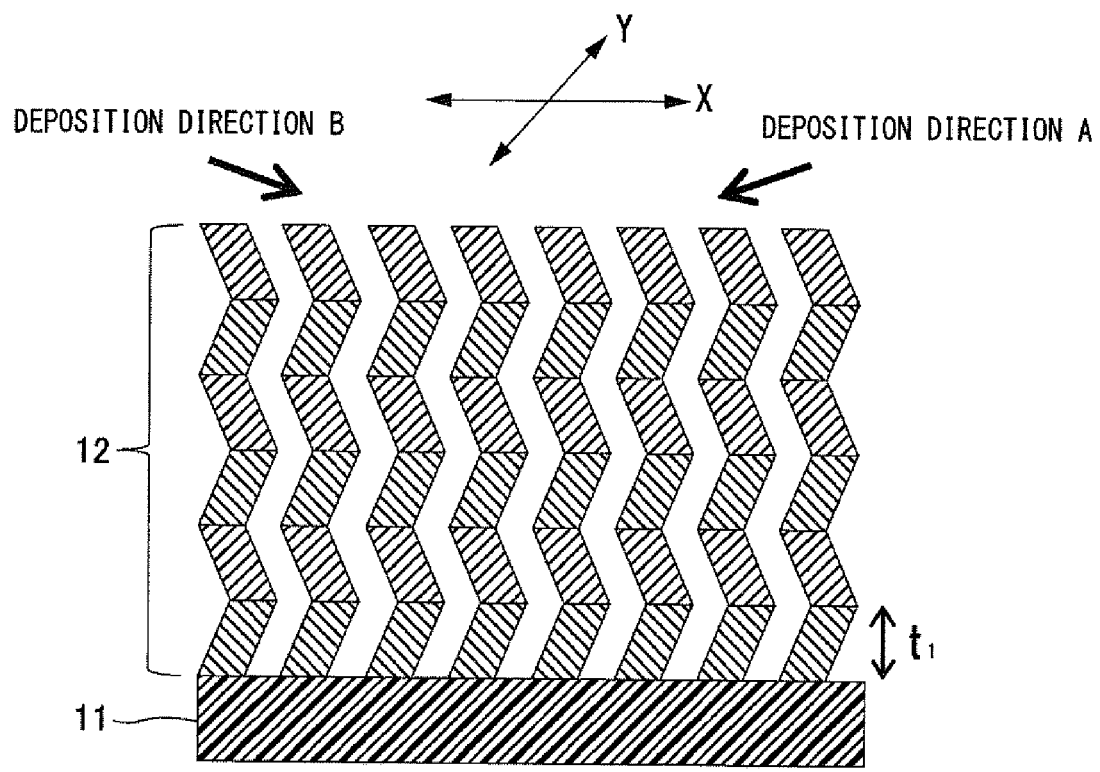
FIG. 2A is a schematic cross-sectional view of a bundle structure example including inorganic fine particles deposited into columnar shapes by oblique deposition.
Figure 2B:
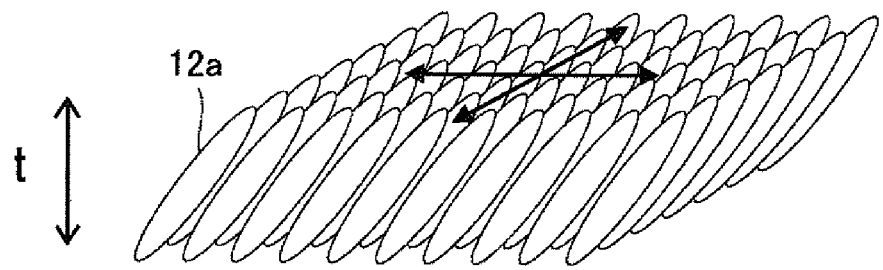
FIG. 2B is a perspective view of an inorganic fine particle layer formed by performing oblique deposition once.

FIG. 2A is a cross-sectional view illustrating a bundle structure example including inorganic fine particles deposited into columnar shapes by oblique deposition. FIG. 2B is a perspective view of an inorganic fine particle layer formed by performing oblique deposition once. The bundle structure layer 12 is formed by obliquely depositing inorganic fine particles 12a by alternating the deposition direction between a deposition direction A and a deposition direction B that differ from each other by 180° on an xy plane which is assumed to be a substrate surface in the xyz orthogonal coordinate system. The inorganic fine particles 12a preferably have a size not larger than the wavelength of the working band and are preferably completely isolated from one another. The inorganic fine particles 12a have shape anisotropy due to a shadowing effect characteristic of oblique deposition and therefore readily generate optical anisotropy in which the optical constants (refractive index and extinction coefficient) along the X axis differ from those along the Y axis. The extinction coefficient of the bundle structure layer 12 can be controlled by the degree of oxidation and the bundle structure layer 12 has a light-absorbing ability if the extinction coefficient is not zero.

Figure 3A:
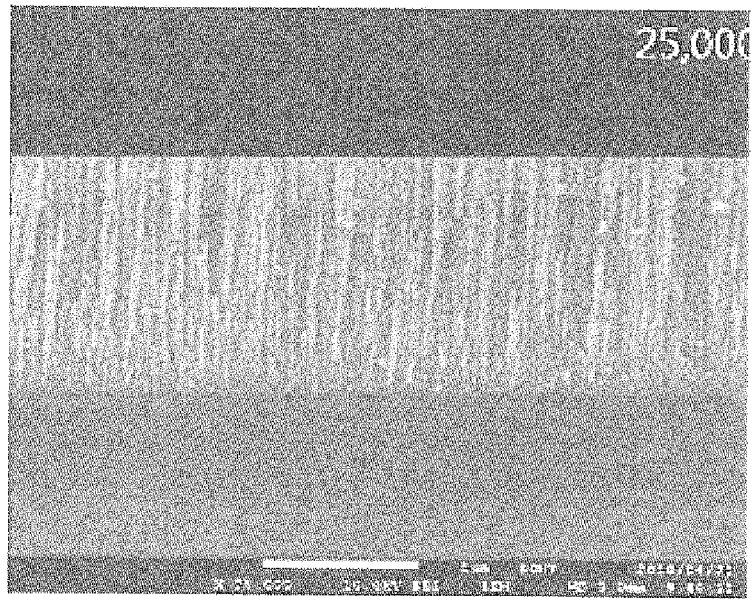
FIG. 3A is a scanning electron microscope (SEM) photograph of a cross section observed in the X direction.
Figure 3B:
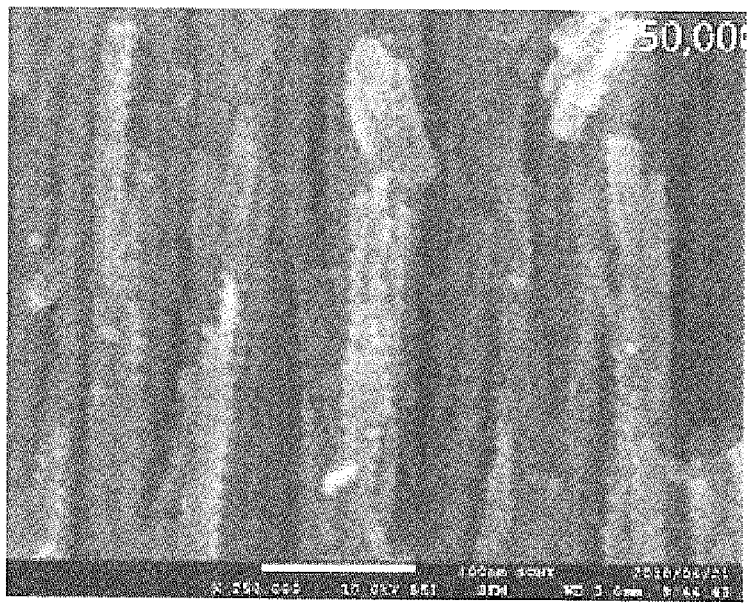
FIG. 3B is an enlarged view of FIG. 3A.
Figure 4A:
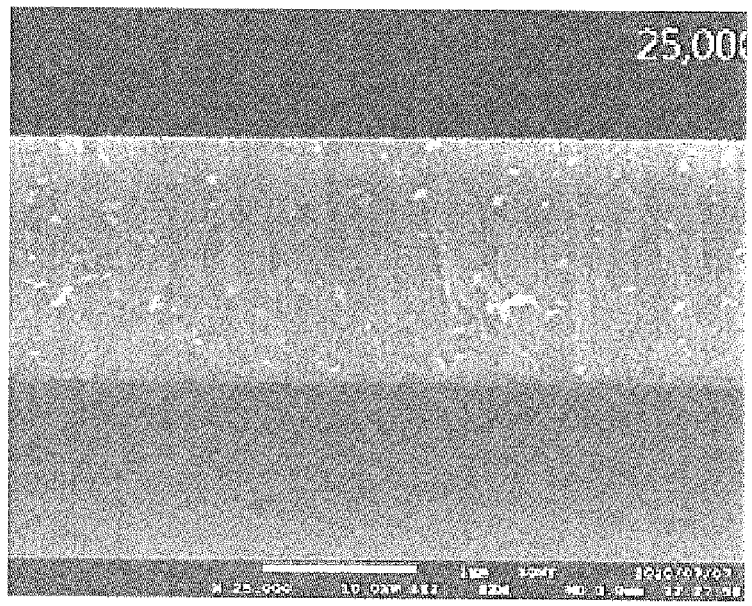
FIG. 4A is a SEM photograph of a cross section observed in the Y direction and FIG. 4B is an enlarged view of FIG. 4A.
Figure 4B:
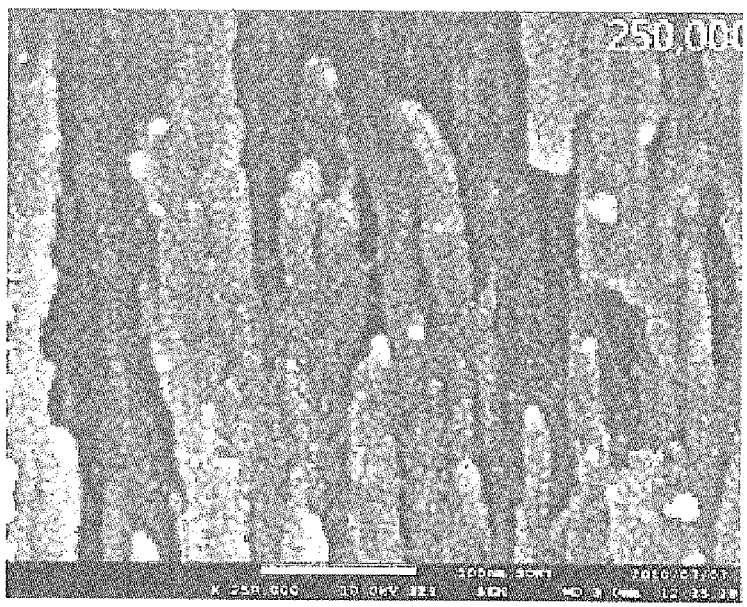
Figure 5:
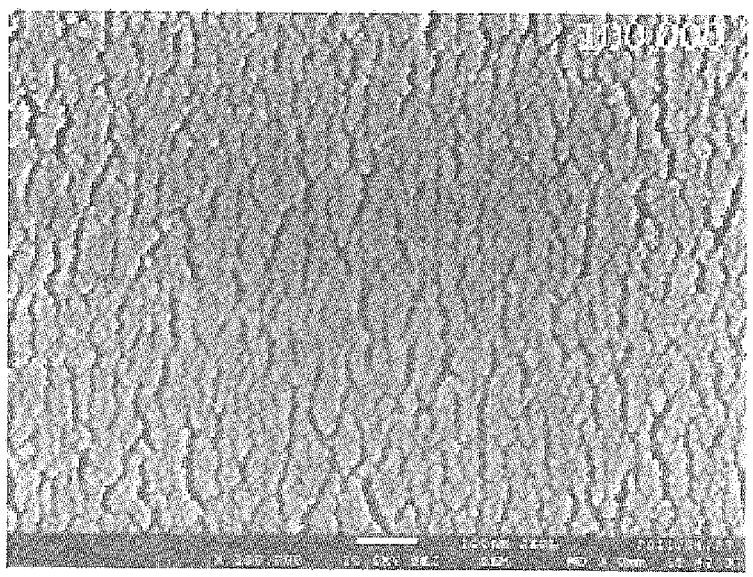
FIG. 5 is a SEM photograph of a flat surface observed in the Z direction.
Figure 5:
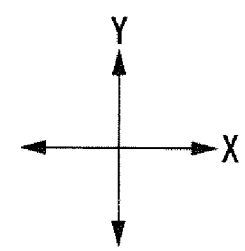

FIG. 3A is a scanning electron microscope (SEM) photograph of a cross section observed in the X direction. FIG. 3B is an enlarged view of FIG. 3A. FIG. 4A is a SEM photograph of a cross section observed in the Y direction and FIG. 4B is an enlarged view of FIG. 4A. FIG. 5 is a SEM photograph of a flat surface observed in the Z direction. This bundle structure is formed by depositing $Ta_2O_5$ into column shapes such that the thickness $t_1$ of the inorganic fine particle layer deposited by performing oblique deposition once is 7 nm in FIG. 2A. The total thickness t of the bundle structure was 1500 nm.

The bundle structure is constituted by a sheaf of nano-size columns as indicated by the cross-sectional shapes (X, Y) illustrated in FIGS. 3B and 4B, and spaces are present between the columns. When viewed from the substrate surface side as illustrated by the surface photograph (Y) in FIG. 5, the bundle structure is constituted by an aggregate of long and narrow fine particles.

Figure 6A:
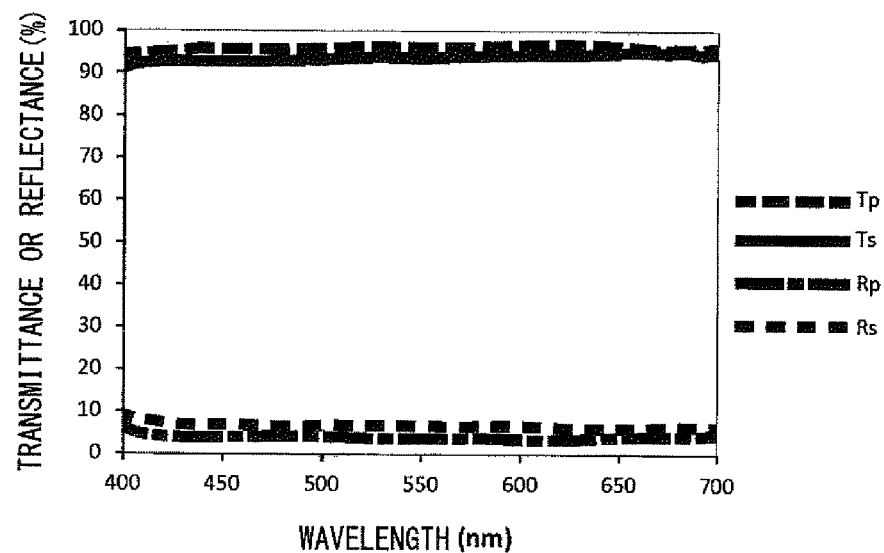
FIG. 6A is a graph indicating optical characteristics of a bundle structure layer formed by depositing 50 nm of $Ta_2O_5$ columns on a glass substrate.
Figure 6B:
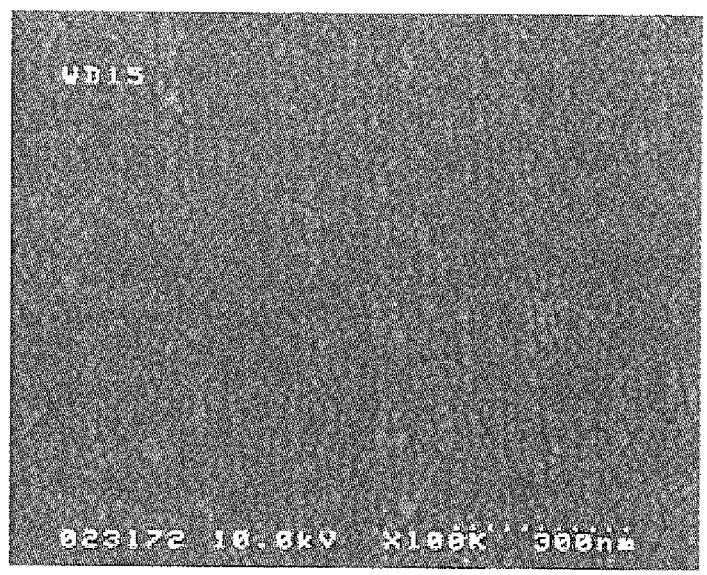
FIG. 6B is a SEM photograph of a flat surface of the bundle structure viewed in the Z direction.

FIG. 6A is a graph indicating optical characteristics of a bundle structure formed by depositing 50 nm of $Ta_2O_5$ columns on a glass substrate. FIG. 6B is a SEM photograph of a surface of the bundle structure viewed in the Z direction. As illustrated in FIG. 6A, the bundle structure has optical anisotropy and characteristics markedly different from typical dielectric thin films. That the bundle structure has optical anisotropy is extremely useful for a polarizing plate for which optical anisotropy is a requisite.

The absorption layer 13 preferably contains at least one selected from Si, Ta, Fe, Al, W, Ti, and Nb. The absorption layer 13 is formed by a deposition method or a sputtering method using at least one substance, such as a metal or a semiconductor, that has a non-zero extinction coefficient as an optical coefficient and a light-absorbing ability. The material therefor is selected based on the applied light wavelength range. Examples of the metal material include Ta, Al, Ag, Cu, Au, Mo, Cr, Ti, W, Ni, Fe, Sn, and Nb as either a single element or an alloy. Examples of the semiconductor material include Si, Ge, Te, ZnO, and silicide materials (β-$FeSi_2$, $MgSi_2$, $NiSi_2$, $BaSi_2$, $CrSi_2$, $CoSi_2$, and TaSi). A mixed material containing a semiconductor material and a metal material, such as a mixed material containing Si and Fe, for example, may also be used.

When a semiconductor material is used, the band gap energy of the semiconductor material must be not larger than the band gap energy corresponding to the absorption for the wavelength of the working band. This is because the band gap energy of the semiconductor affects the light-absorbing ability. For example, for visible light, a material that exhibits absorption at a wavelength of 400 nm or more, that is, a material having a band gap of 3.1 eV or less, must be used.

When the metal materials and/or the semiconductor materials described above are used in combination to form the absorption layer 13, the interference effect for the light in the working band can be enhanced so as to increase the contrast in the transmission axis direction for a desired wavelength, and at the same time, the reflected component from the polarizing plate not desirable for transmission-type liquid crystal display devices can be suppressed.

The specific combination of materials is selected based on the optical constants such as a refractive index n and an extinction coefficient k. For example, when Si having a high refractive index (n=4.08 (550 nm), k=0.04) is used, Ta (n=2.48 (550 nm), k=1.83) having a refractive index markedly different from Si and an extinction coefficient k larger than Si is used to enhance the absorbing effect and interference effect and increase contrast. When $Ta_2O_5$ (n=2.16 (550 nm)) is used as the dielectric contained in the bundle structure layer 12, a Ta layer having a refractive index not much different from $Ta_2O_5$ is formed on the bundle structure layer 12 and a Si layer is formed on the Ta layer so that reflection can be suppressed and the transmittance can be improved. The Si layer preferably contains Fe. In this manner, the reflectance suppressing effect can be improved.

Figure 7A:
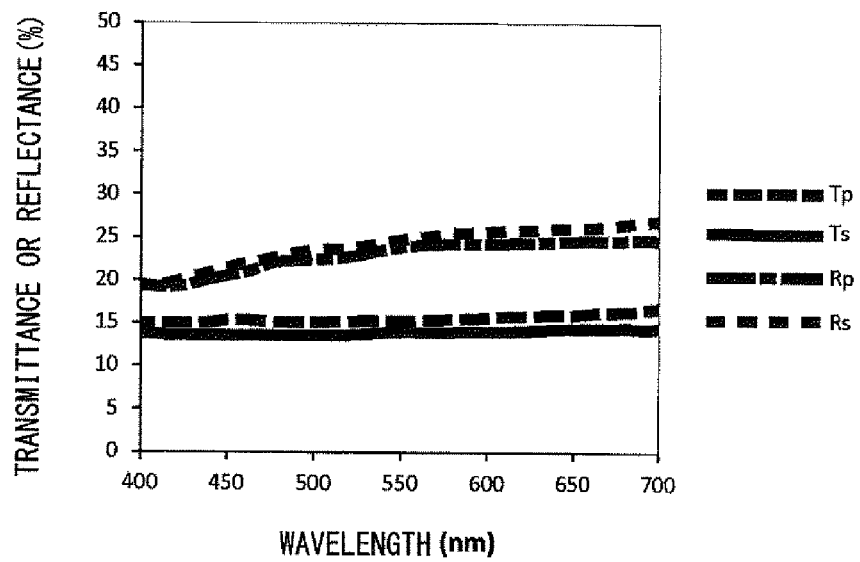
FIG. 7A is a graph indicating optical characteristics of a structure in which 20 nm of Ta is deposited on the bundle structure layer by a sputtering method.
Figure 7B:
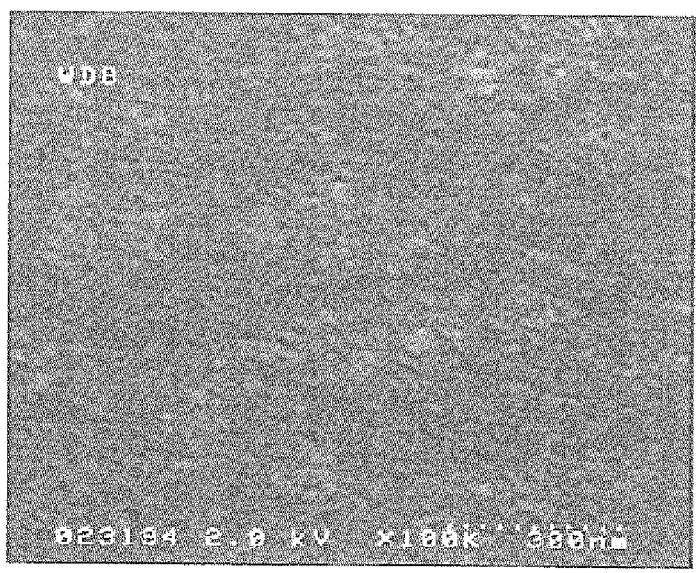
FIG. 7B is a SEM photograph of a flat surface of this structure observed in the Z direction.

FIG. 7A is a graph indicating optical characteristics of a structure in which 20 nm of Ta is deposited on the bundle structure layer by a sputtering method, and FIG. 7B is a SEM photograph of a flat surface of this structure observed in the Z direction.

Figure 8A:
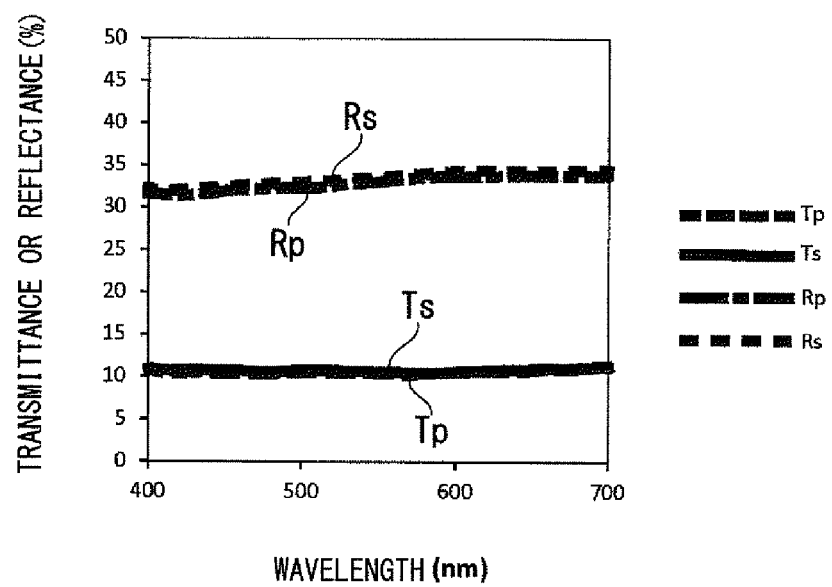
FIG. 8A is a graph indicating optical characteristics of a structure in which 20 nm of Ta is deposited on a glass substrate by a sputtering method.
Figure 8B:
FIG. 8B is a SEM photograph of a flat surface of this structure observed in the Z direction.

FIG. 8A is a graph indicating optical characteristics of a structure in which 20 nm of Ta is deposited on a glass substrate by a sputtering method, and FIG. 8B is a SEM photograph of a flat surface of this structure observed in the Z direction. The bundle structure was prepared by depositing 25 nm of $Ta_2O_5$ on a glass substrate.

A comparison of FIG. 7A and FIG. 8A indicates that the optical characteristics of the glass/bundle structure/Ta film have optical anisotropy and are markedly different from those of the glass/Ta film. The optical characteristics of the glass/bundle structure/Ta film feature increased absorption and scattering compared to the optical characteristics of the glass/Ta film since the bundle structure is formed of long and narrow fine particles having a size not greater than the wavelength, and as a result, the reflectance can be decreased. Optical anisotropy thereof is also preferable since Tp>Ts.

As discussed above, combining the bundle structure layer 12 and the absorption layer 13 can generate a polarizing function. While the bundle structure layer 12 and the absorption layer 13 can be used as a polarizing plate by themselves, a reflection layer 15 may be formed thereon with a dielectric layer 14 therebetween so as to enhance the interference effect.

The dielectric layer 14 is formed to have such a thickness that the polarized light that has passed through the absorption layer 13 and is reflected by the reflection layer 15 has a phase shifted by a half wavelength with respect to the polarized light reflected by the absorption layer 13. Specifically, the thickness is appropriately adjusted within the range of 1 to 500 nm in which the phase of the polarized light can be adjusted and the interference effect can be enhanced. In this embodiment, the reflected light is absorbed by the absorption layer 13 and thus contrast can be improved without optimizing the thickness. Thus, in practice, the thickness may be determined in view of the desired polarization property and the actual manufacturing process.

A commonly used material such as $SiO_2$, $Al_2O_3$, or $MgF_2$ can be used as the material for the dielectric layer 14. The refractive index of the dielectric layer 14 is preferably greater than 1.0 and not greater than 2.5. Since optical characteristics of the absorption layer 13 are affected by the refractive index of the surroundings, the polarization property may be controlled by the material of the dielectric layer 14.

The reflection layer 15 is constituted by metal thin films having a strip shape and extending on the dielectric layer 14 in the Y direction, which is along the absorption axis. In other words, the reflection layer 15 has a function of a wire grid polarizer that attenuates a polarized wave (TE wave (S wave)) in the light coming in from the translucent substrate 11, the polarized wave having an electric field component in a direction (Y axis direction) parallel to the longitudinal direction of the wire grid, and that transmits a polarized wave (TM wave (P wave)) that has an electric field component in a direction (X axis direction) orthogonal to the longitudinal direction of the wire grid.

The material for the reflection layer 15 may be any material that can reflect light in the working band. Examples thereof include single metal elements such as Al, Ag, Cu, Mo, Cr, Ti, Ni, W, Fe, Si, Ge, and Te, and alloys containing these elements, and semiconductor materials. Alternatively, a non-metal inorganic film or a resin film having a surface with a reflectance increased by coloring, for example, can be used instead of the metal material.

The pitch, line width/pitch, thin film height (thickness or lattice depth), and thin film length (lattice length) of the reflection layer 15 are preferably in the following ranges:

0.05µm<pitch<0.8µm 0.1<(line width/pitch)<0.9

0.01µm<thin film height<1µm 0.05µm<thin film length

A protective film that covers the surfaces of the translucent substrate 11 and the protrusions that form the lattice is preferably provided so long as changes in the optical characteristics caused thereby do not have any effect in practice. For example, $SiO_2$ or the like may be deposited to improve reliability such as moisture resistance. The protective film is preferably formed by plasma chemical vapor deposition (CVD). A protective film can be deposited onto the spaces between the protrusions of the lattice if plasma CVD is employed.

According to the polarizing plate having the above-described structure, the polarized wave (TE wave (S wave)) having an electric field component parallel to the lattice of the reflection layer can be attenuated and the polarized wave (TM wave (P wave)) having an electric field component perpendicular to the lattice can be transmitted due to the four actions of the polarizing plate, namely, transmission, reflection, interference, and selective absorption of polarized light. In other words, the TE wave is attenuated due to the action of the absorption layer 13 of selectively absorbing the polarized light, and the TE wave that has passed through the absorption layer 13 and the dielectric layer 14 is reflected by the lattice-shaped reflection layer 15 that functions as a wire grid. The thickness and refractive index of the dielectric layer 14 are appropriately adjusted so that the TE wave which has been reflected by the reflection layer 15 is partly reflected as the light passes through the absorption layer 13 and that the partly reflected light can be returned to the reflection layer 15. Moreover, the light that has passed through the absorption layer 13 can be attenuated by interference. When selective attenuation of the TE wave is performed as such, a desired polarization property can be obtained.

Since the polarizing plate of the first embodiment includes a bundle structure layer 12 constituted by a columnar sheaf formed of at least one selected from a dielectric, a metal, and a semiconductor, light absorption and light scattering are enhanced, and thus reflectance can be decreased and excellent optical characteristics can be obtained. Since the polarizing plate of the first embodiment is formed of inorganic materials having higher durability than organic materials, high light fastness for intense light such as one used in liquid crystal projectors can be exhibited and high reliability can be obtained. Since the polarizing plate of the first embodiment can decrease the reflectance over a wide wavelength range, the polarizing plate can be used as commodity polarizing plates such as polarizing filters for cameras and polarizing plates for liquid crystal televisions and can meet a variety of demand with high reliability.

[Modifications of First Embodiment]

Modifications of the first embodiment are described next with reference to the drawings. The identical or equivalent components to those of Structural Examples 1 and 2 illustrated in FIGS. 1A and 1B are referred by the same reference symbols and the descriptions therefor are omitted.

Figure 9A:
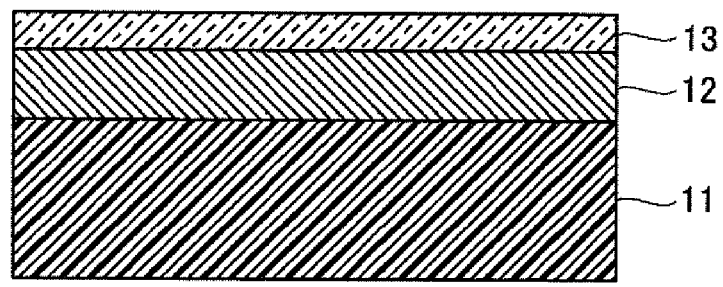
FIG. 9A is a schematic cross-sectional view of a polarizing plate of Structural Example 3 and FIG. 9B is a schematic cross-sectional view of a polarizing plate of Structural Example 4.
Figure 9B:
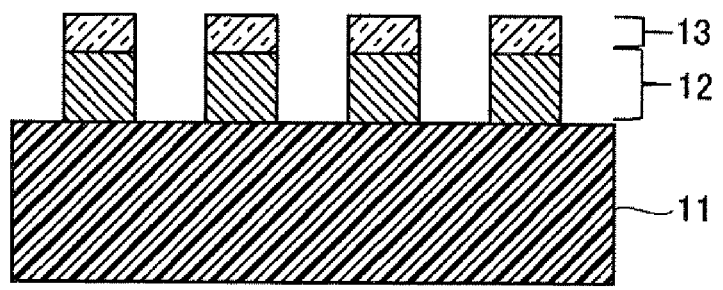

FIG. 9A is a schematic cross-sectional view of a polarizing plate of Structural Example 3 and FIG. 9B is a schematic cross-sectional view of a polarizing plate of Structural Example 4. As described above, the bundle structure layer 12 and the absorption layer 13 can together increase the light absorption anisotropy and can be used as a polarizing plate.

The polarizing plate of Structural Example 3 illustrated in FIG. 9A includes a translucent substrate 11 that transmits light in the working band, a bundle structure layer 12 disposed on the translucent substrate 11 and constituted by a columnar sheaf formed of at least one selected from a dielectric, a metal, and a semiconductor, and an absorption layer 13 disposed on the bundle structure layer 12.

One or both of the bundle structure layer 12 and the absorption layer 13 are preferably arranged in a one-dimensional lattice at a pitch smaller than the wavelength of light in the working band.

More preferably, both the bundle structure layer 12 and the absorption layer 13 are arranged in a one-dimensional lattice at a pitch smaller than the wavelength of light in the working band. A preferable example thereof is a polarizing plate of Structural Example 4 illustrated in FIG. 9B, in which the polarizing plate includes a translucent substrate 11 that transmits light in the working band, a bundle structure layer 12 disposed on the translucent substrate 11 and constituted by a columnar sheaf formed of at least one selected from a dielectric, a metal, and a semiconductor, and an absorption layer 13 disposed on the bundle structure layer 12, and the bundle structure layer 12 and the absorption layer 13 are arranged in a one-dimensional lattice. In other words, this polarizing plate has a one-dimensional lattice grid structure constituted by protrusions aligned on the translucent substrate 11 at particular intervals, and each of the protrusions is constituted by the bundle structure layer 12 and the absorption layer 13 stacked in that order from the translucent substrate 11 side.

When one or both of the bundle structure layer 12 and the absorption layer 13 are arranged in a one-dimensional lattice at a pitch smaller than the wavelength of light in the working band, contrast (extinction ratio: transmission axis transmittance/absorption axis transmittance) can be improved. As long as the transmission axis transmittance of the bundle structure layer 12 is high and desired optical characteristics are obtained, the bottom of recesses of the wire grid structure may be the bundle structure layer 12 instead of the translucent substrate 11.

Figure 10A:
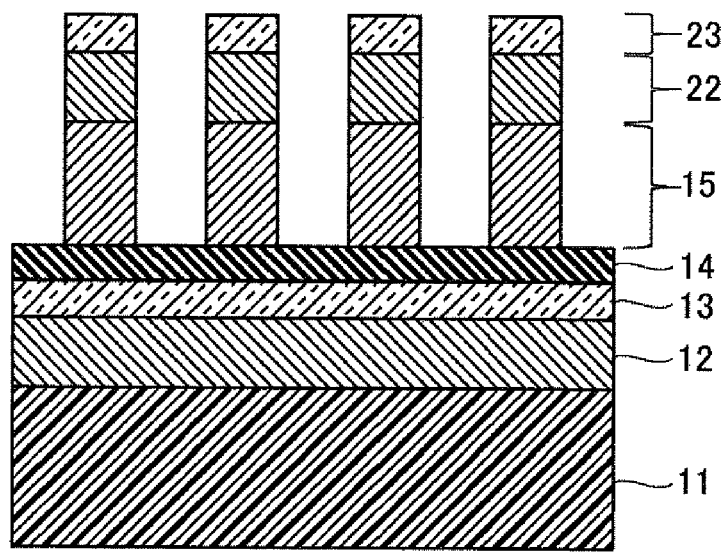
FIG. 10A is a schematic cross-sectional view of a polarizing plate of Structural Example 5.
Figure 10B:
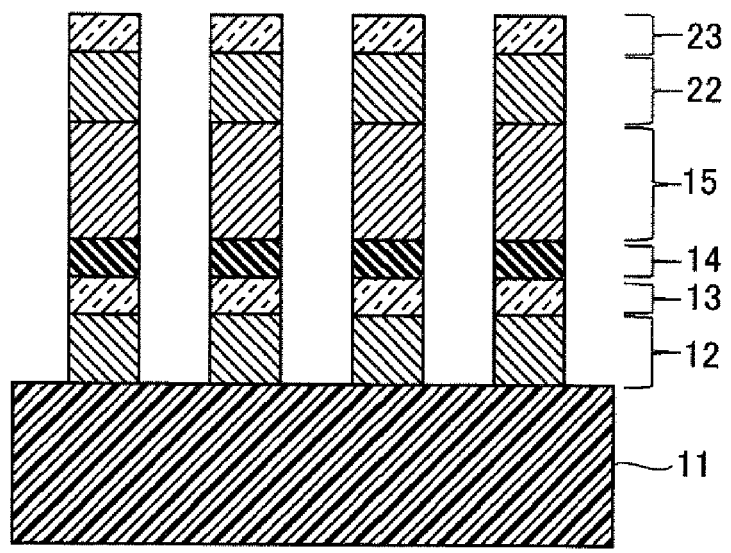
FIG. 10B is a schematic cross-sectional view of a polarizing plate of Structural Example 6.

FIG. 10A is a schematic cross-sectional view of a polarizing plate of Structural Example 5. FIG. 10B is a schematic cross-sectional view of a polarizing plate of Structural Example 6. In Structural Examples 5 and 6, an upper bundle structure layer 22 and an upper absorption layer 23 are additionally provided to Structural Examples 1 and 2 illustrated in FIG. 1.

That is, the polarizing plate of Structural Example 5 illustrated in FIG. 10A includes a translucent substrate 11 that transmits light in the working band, a bundle structure layer 12 disposed on the translucent substrate 11 and constituted by a columnar sheaf formed of at least one selected from a dielectric, a metal, and a semiconductor, an absorption layer 13 disposed on the bundle structure layer 12, a dielectric layer 14 disposed on the absorption layer 13, a reflection layer 15 disposed on the dielectric layer 14 and arranged in a one-dimensional lattice at a pitch smaller than the wavelength of the light in the working band, an upper bundle structure layer 22 disposed on the reflection layer 15, constituted by a columnar sheaf formed of at least one selected from a dielectric, a metal, and a semiconductor, and arranged in a one-dimensional lattice at a pitch smaller than the wavelength of light in the working band, and an upper absorption layer 23 disposed on the upper bundle structure layer 22 and arranged in a one-dimensional lattice at a pitch smaller than the wavelength of light in the working band. The upper bundle structure layer 22 and the upper absorption layer 23 are equivalent to the bundle structure layer 12 and the absorption layer 13, and the descriptions thereof are omitted.

Preferably, at least one layer selected from the bundle structure layer 12, the absorption layer 13, and the dielectric layer 14 is arranged in a one-dimensional lattice at a pitch smaller than the wavelength of light in the working band.

More preferably, all of the bundle structure layer 12, the absorption layer 13, and the dielectric layer 14 are arranged in a one-dimensional lattice at a pitch smaller than the wavelength of light in the working band as with the reflection layer 15. A preferable example thereof is a polarizing plate of Structural Example 6 illustrated in FIG. 10B in which the polarizing plate includes a translucent substrate 11 that transmits light in the working band, a bundle structure layer 12 disposed on the translucent substrate 11 and constituted by a columnar sheaf formed of at least one selected from a dielectric, a metal, and a semiconductor, an absorption layer 13 disposed on the bundle structure layer 12, a dielectric layer 14 disposed on the absorption layer 13, a reflection layer 15 disposed on the dielectric layer 14, an upper bundle structure layer 22 disposed on the reflection layer 15 and constituted by a columnar sheaf formed of at least one selected from a dielectric, a metal, and a semiconductor, and an upper absorption layer 23 disposed on the upper bundle structure layer 22, and the bundle structure layer 12, the absorption layer 13, the dielectric layer 14, the reflection layer 15, the upper bundle structure layer 22, and the upper absorption layer 23 are arranged in a one-dimensional lattice. In other words, this polarizing plate has a one-dimensional lattice wire grid structure constituted by protrusions aligned on the translucent substrate 11 at particular intervals, and each of the protrusions is constituted by the bundle structure layer 12, the absorption layer 13, the dielectric layer 14, the reflection layer 15, the upper bundle structure layer 22, and the upper absorption layer 23 stacked in that order from the translucent substrate 11 side.

Figure 11A:
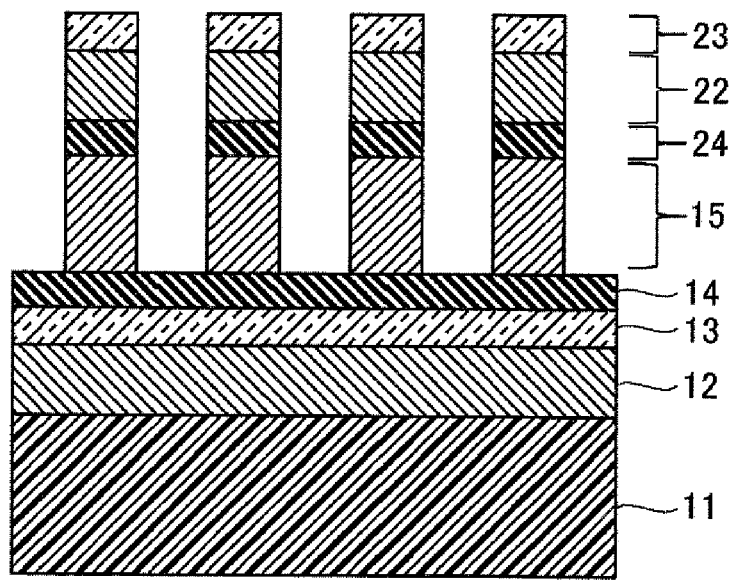
FIG. 11A is a schematic cross-sectional view of a polarizing plate of Structural Example 7.
Figure 11B:
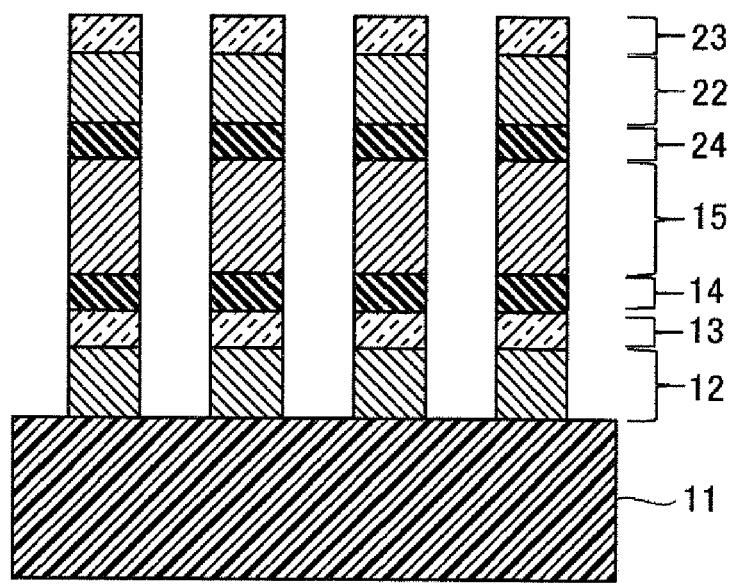
FIG. 11B is a schematic cross-sectional view of a polarizing plate of Structural Example 8.

FIG. 11A is a schematic cross-sectional view of a polarizing plate of Structural Example 7. FIG. 11B is a schematic cross-sectional view of a polarizing plate of Structural Example 8. In Structural Examples 7 and 8, an upper dielectric layer 24 is additionally provided between the reflection layer 15 and the upper bundle structure layer 22 of Structural Examples 5 and 6 illustrated in FIG. 10.

That is, the polarizing plate of Structural Example 7 illustrated in FIG. 11A includes a translucent substrate 11 that transmits light in the working band, a bundle structure layer 12 disposed on the translucent substrate 11 and constituted by a columnar sheaf formed of at least one selected from a dielectric, a metal, and a semiconductor, an absorption layer 13 disposed on the bundle structure layer 12, a dielectric layer 14 disposed on the absorption layer 13, a reflection layer 15 disposed on the dielectric layer 14 and arranged in a one-dimensional lattice at a pitch smaller than the wavelength of the light in the working band, an upper dielectric layer 24 disposed on the reflection layer 15 and arranged in a one-dimensional lattice at a pitch smaller than the wavelength of light in the working band, an upper bundle structure layer 22 disposed on the upper dielectric layer 24, constituted by a columnar sheaf formed of at least one selected from a dielectric, a metal, and a semiconductor, and arranged in a one-dimensional lattice at a pitch smaller than the wavelength of light in the working band, and an upper absorption layer 23 disposed on the upper bundle structure layer 22 and arranged in a one-dimensional lattice at a pitch smaller than the wavelength of light in the working band. The upper dielectric layer 24 is equivalent to the dielectric layer 14 and the description therefor is omitted.

The polarizing plate of Structural Example 8 illustrated in FIG. 11B includes a translucent substrate 11 that transmits light in the working band, a bundle structure layer 12 disposed on the translucent substrate 11 and constituted by a columnar sheaf formed of at least one selected from a dielectric, a metal, and a semiconductor, an absorption layer 13 disposed on the bundle structure layer 12, a dielectric layer 14 disposed on the absorption layer 13, a reflection layer 15 disposed on the dielectric layer 14, an upper dielectric layer 24 disposed on the reflection layer, an upper bundle structure layer 22 disposed on the upper dielectric layer 24 and constituted by a columnar sheaf formed of at least one selected from a dielectric, a metal, and a semiconductor, and an upper absorption layer 23 disposed on the upper bundle structure layer 22, and the bundle structure layer 12, the absorption layer 13, the dielectric layer 14, the reflection layer 15, the upper dielectric layer 24, the upper bundle structure layer 22, and the upper absorption layer 23 are arranged in a one-dimensional lattice.

As indicated by Structural Examples 5 to 8 illustrated in FIGS. 10A, 10B, 11A, and 11B, when the upper bundle structure layer 22 and the upper absorption layer 23 are provided, light sources can be placed on both the translucent substrate 11 side and the upper absorption layer 23 side.

Second Embodiment

A second embodiment is described next with reference to the drawings. In the first embodiment, the bundle structure layer 12 is disposed on the translucent substrate 11; however, in the second embodiment, a bundle structure layer 12 is formed on an absorption film. The identical or equivalent components to those of the first embodiment are referred by the same reference symbols and the descriptions therefor are omitted.

Figure 12A:
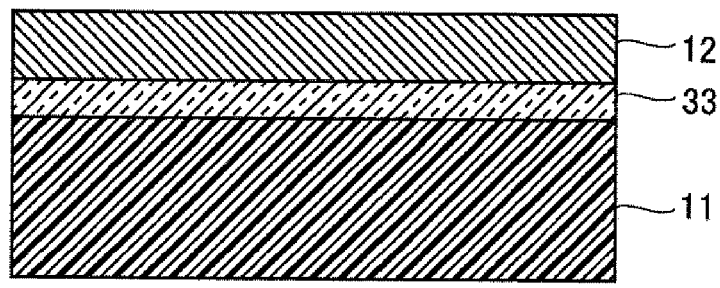
FIG. 12A is a schematic cross-sectional view of a polarizing plate of Structural Example 9 and FIG. 12B is a schematic cross-sectional view of a polarizing plate of Structural Example 10.
Figure 12B:
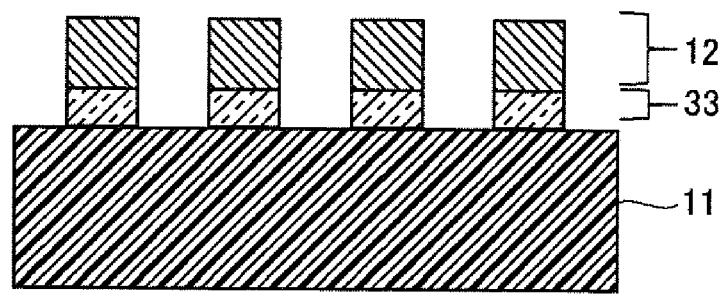

FIG. 12A is a schematic cross-sectional view of a polarizing plate of Structural Example 9 and FIG. 12B is a schematic cross-sectional view of a polarizing plate of Structural Example 10.

The polarizing plate of Structural Example 9 illustrated in FIG. 12A includes a translucent substrate 11 that transmits light in the working band, an absorption layer 33 disposed on the translucent substrate 11, and a bundle structure layer 12 disposed on the absorption layer 33 and constituted by a columnar sheaf formed of at least one selected from a dielectric, a metal, and a semiconductor.

The absorption layer 33 is in the form of fine particles since the absorption layer 33 is etched by using the bundle structure layer 12 as a mask or is formed by oblique deposition, for example. The material for the absorption layer 33 contains, for example, at least one selected from Si, Ta, Fe, Al, W, Ti, Nb, Ag, Cu, and Au as with the absorption layer 13 of Structural Examples 1 to 8. As a result, a good polarization property can be obtained.

One or both of the absorption layer 33 and the bundle structure layer 12 are preferably arranged in a one-dimensional lattice at a pitch smaller than the wavelength of light in the working band.

More preferably, both the absorption layer 33 and the bundle structure layer 12 are arranged in a one-dimensional lattice at a pitch smaller than the wavelength of light in the working band. A preferable example thereof is the polarizing plate of Structural Example 10 illustrated in FIG. 12B in which the polarizing plate includes a translucent substrate 11 that transmits light in the working band, an absorption layer 33 disposed on the translucent substrate 11, and a bundle structure layer 12 disposed on the absorption layer 33 and constituted by a columnar sheaf formed of at least one selected from a dielectric, a metal, and a semiconductor, and the absorption layer 33 and the bundle structure layer 12 are arranged in a one-dimensional lattice. In other words, this polarizing plate has a one-dimensional lattice grid structure constituted by protrusions aligned on the translucent substrate 11 at particular intervals, and each of the protrusions is constituted by the absorption layer 33 and the bundle structure layer 12 stacked in that order from the translucent substrate 11 side.

Since one or both of the absorption layer 33 and the bundle structure layer 12 are arranged in a one-dimensional lattice at a pitch smaller than the wavelength of light in the working band, contrast (extinction ratio: transmission axis transmittance/absorption axis transmittance) can be improved.

Figure 13A:
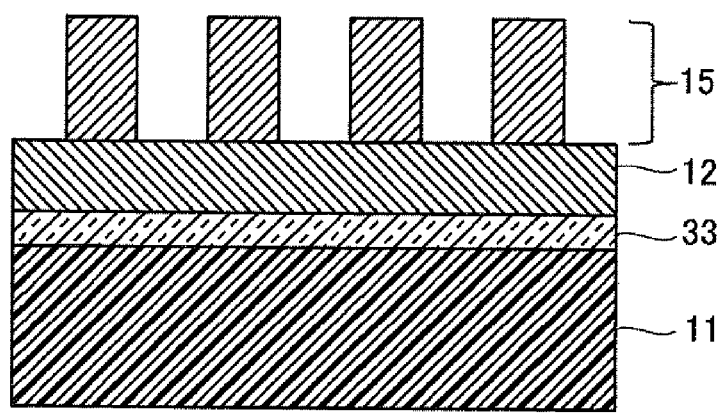
FIG. 13A is a schematic cross-sectional view of a polarizing plate of Structural Example 11.
Figure 13B:
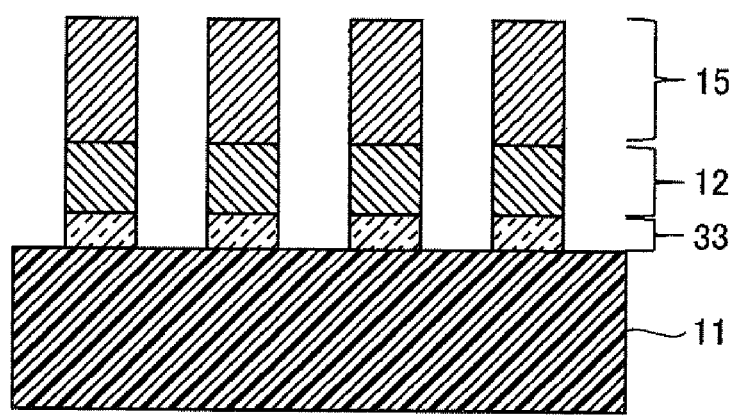
FIG. 13B is a schematic cross-sectional view of a polarizing plate of Structural Example 12.

FIG. 13A is a schematic cross-sectional view of a polarizing plate of Structural Example 11. FIG. 13B is a schematic cross-sectional view of a polarizing plate of Structural Example 12.

The polarizing plate of Structural Example 11 illustrated in FIG. 13A includes a translucent substrate 11 that transmits light in the working band, an absorption layer 33 disposed on the translucent substrate 11, a bundle structure layer 12 disposed on the absorption layer 33 and constituted by a columnar sheaf formed of at least one selected from a dielectric, a metal, and a semiconductor, and a reflection layer 15 disposed on the bundle structure layer 12 and arranged in a one-dimensional lattice at a pitch smaller than the wavelength of light in the working band.

Preferably, one or both of the absorption layer 33 and the bundle structure layer 12 are arranged in a one-dimensional lattice at a pitch smaller than the wavelength of light in the working band, as with the reflection layer 15.

More preferably, both the absorption layer 33 and the bundle structure layer 12 are arranged in a one-dimensional lattice at a pitch smaller than the wavelength of light in the working band, as with the reflection layer 15. A preferable example thereof is the polarizing plate of Structural Example 12 illustrated in FIG. 13B in which the polarizing plate includes a translucent substrate 11 that transmits light in the working band, an absorption layer 33 disposed on the translucent substrate 11, a bundle structure layer 12 disposed on the absorption layer 33 and constituted by a columnar sheaf formed of at least one selected from a dielectric, a metal, and a semiconductor, and a reflection layer 15 disposed on the bundle structure layer 12, and the absorption layer 33, the bundle structure layer 12, and the reflection layer 15 are arranged in a one-dimensional lattice. In other words, this polarizing plate has a one-dimensional lattice grid structure constituted by protrusions aligned on the translucent substrate 11 at particular intervals, and each of the protrusions is constituted by the absorption layer 33, the bundle structure layer 12, and the reflection layer 15 stacked in that order from the translucent substrate 11 side.

When one or both of the absorption layer 33 and the bundle structure layer 12 are arranged in a one-dimensional lattice at a pitch smaller than the wavelength of light in the working band as with the reflection layer 15, contrast (extinction ratio: transmission axis transmittance/absorption axis transmittance) can be improved.

Figure 14A:
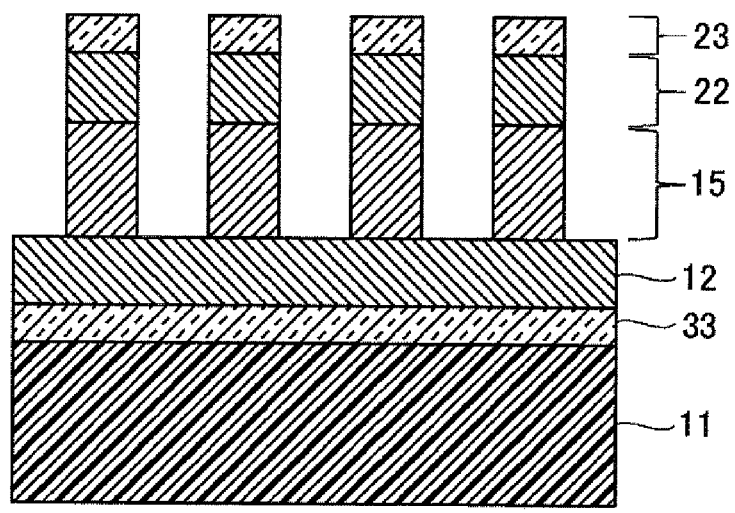
FIG. 14A is a schematic cross-sectional view of a polarizing plate of Structural Example 13.
Figure 14B:
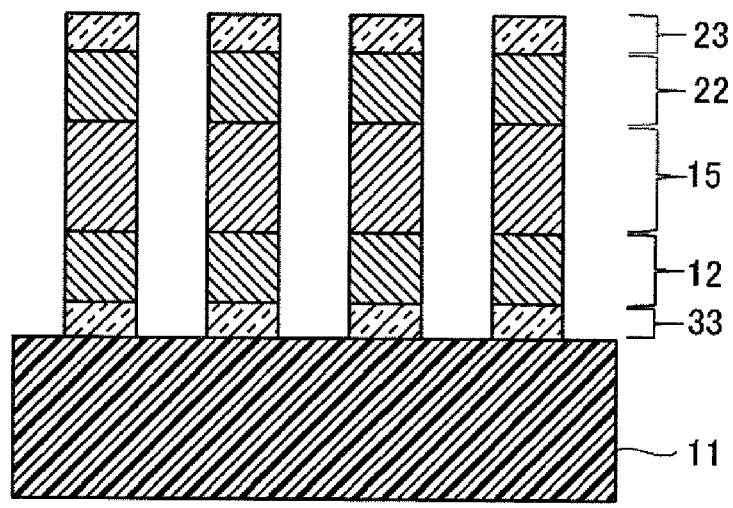
FIG. 14B is a schematic cross-sectional view of a polarizing plate of Structural Example 14.

FIG. 14A is a schematic cross-sectional view of a polarizing plate of Structural Example 13, and FIG. 14B is a schematic cross-sectional view of a polarizing plate of Structural Example 14. In Structural Examples 13 and 14, an upper bundle structure layer 22 and an upper absorption layer 23 are additionally provided to Structural Examples 11 and 12 illustrated in FIG. 13.

That is, the polarizing plate of Structural Example 13 illustrated in FIG. 14A includes a translucent substrate 11 that transmits light in the working band, an absorption layer 33 disposed on the translucent substrate 11, a bundle structure layer 12 disposed on the absorption layer 33 and constituted by a columnar sheaf formed of at least one selected from a dielectric, a metal, and a semiconductor, a reflection layer 15 disposed on the bundle structure layer 12 and arranged in a one-dimensional lattice at a pitch smaller than the wavelength of light in the working band, an upper bundle structure layer 22 disposed on the reflection layer 15, constituted by a columnar sheaf formed of at least one selected from a dielectric, a metal, and a semiconductor, and arranged in a one-dimensional lattice at a pitch smaller than the wavelength of light in the working band, and an upper absorption layer 23 disposed on the upper bundle structure layer 22 and arranged in a one-dimensional lattice at a pitch smaller than the wavelength of light in the working band. The upper bundle structure layer 22 and the upper absorption layer 23 are equivalent to the bundle structure layer 12 and the absorption layer 33 and the descriptions thereof are omitted.

One or both of the absorption layer 33 and the bundle structure layer 12 are preferably arranged in a one-dimensional lattice at a pitch smaller than the wavelength of light in the working band.

More preferably, both the absorption layer 33 and the bundle structure layer 12 are arranged in a one-dimensional lattice at a pitch smaller than the wavelength of light in the working band. A preferable example thereof is the polarizing plate of Structural Example 14 illustrated in FIG. 14B in which the polarizing plate includes a translucent substrate 11 that transmits light in the working band, an absorption layer 33 disposed on the translucent substrate 11, a bundle structure layer 12 disposed on the absorption layer 33 and constituted by a columnar sheaf formed of at least one selected from a dielectric, a metal, and a semiconductor, a reflection layer 15 disposed on the bundle structure layer 12, an upper bundle structure layer 22 disposed on the reflection layer 15 and constituted by a columnar sheaf formed of at least one selected from a dielectric, a metal, and a semiconductor, and an upper absorption layer 23 disposed on the upper bundle structure layer 22, and the absorption layer 33, the bundle structure layer 12, and the reflection layer 15 are arranged in a one-dimensional lattice. In other words, this polarizing plate has a one-dimensional lattice wire grid structure constituted by protrusions aligned on the translucent substrate 11 at particular intervals, and each of the protrusions is constituted by the absorption layer 33, the bundle structure layer 12, the reflection layer 15, the upper bundle structure layer 22, and the upper absorption layer 23 stacked in that order from the translucent substrate 11 side.

Figure 15A:
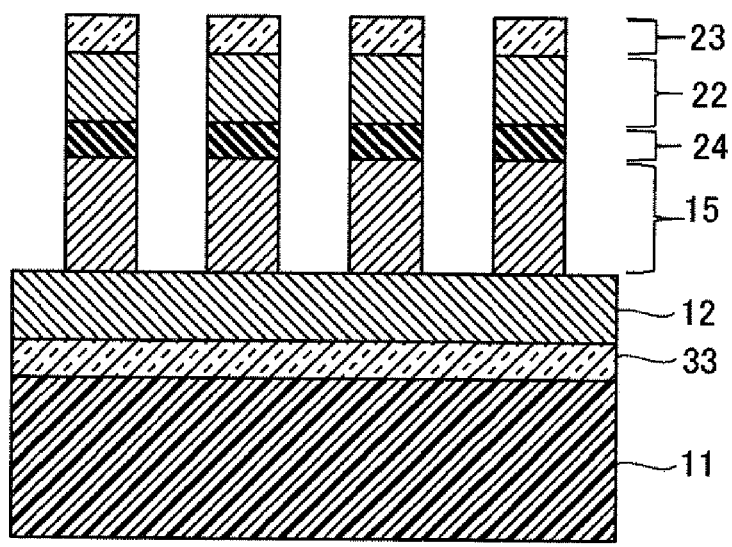
FIG. 15A is a schematic cross-sectional view of a polarizing plate of Structural Example 15.
Figure 15B:
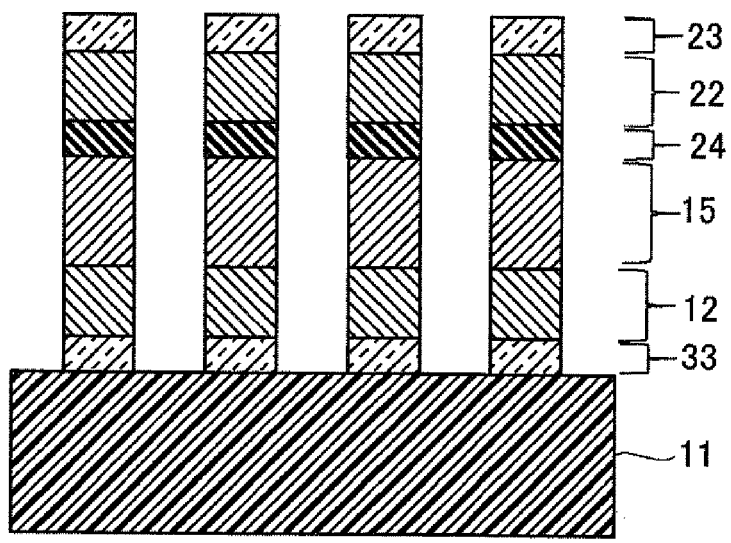
FIG. 15B is a schematic cross-sectional view of a polarizing plate of Structural Example 16.

FIG. 15A is a schematic cross-sectional view of a polarizing plate of Structural Example 15. FIG. 15B is a schematic cross-sectional view of a polarizing plate of Structural Example 16. In Structural Examples 15 and 16, an upper dielectric layer 24 is provided between the reflection layer 15 and the upper bundle structure layer 22 in Structural Examples 13 and 14 illustrated in FIG. 14.

That is, the polarizing plate of Structural Example 15 illustrated in FIG. 15A includes a translucent substrate 11 that transmits light in the working band, an absorption layer 33 disposed on the translucent substrate 11, a bundle structure layer 12 disposed on the absorption layer 33 and constituted by a columnar sheaf formed of at least one selected from a dielectric, a metal, and a semiconductor, a reflection layer 15 disposed on the bundle structure layer 12 and arranged in a one-dimensional lattice at a pitch smaller than the wavelength of light in the working band, an upper dielectric layer 24 disposed on the reflection layer 15 and arranged in a one-dimensional lattice at a pitch smaller than the wavelength of light in the working band, an upper bundle structure layer 22 disposed on the upper dielectric layer 24, constituted by a columnar sheaf formed of at least one selected from a dielectric, a metal, and a semiconductor, and arranged in a one-dimensional lattice at a pitch smaller than the wavelength of light in the working band, and an upper absorption layer 23 disposed on the upper bundle structure layer 22 and arranged in a one-dimensional lattice at a pitch smaller than the wavelength of light in the working band. The upper dielectric layer 24 is equivalent to the dielectric layer 14 in Structural Examples 1, 2, and 5 to 8, and the description thereof is omitted.

The polarizing plate of Structural Example 16 illustrated in FIG. 15B includes a translucent substrate 11 that transmits light in the working band, an absorption layer 33 disposed on the translucent substrate 11, a bundle structure layer 12 disposed on the absorption layer 33 and constituted by a columnar sheaf formed of at least one selected from a dielectric, a metal, and a semiconductor, a reflection layer 15 disposed on the bundle structure layer 12, an upper dielectric layer 24 disposed on the reflection layer 15, an upper bundle structure layer 22 disposed on the upper dielectric layer 24 and constituted by a columnar sheaf formed of at least one selected from a dielectric, a metal, and a semiconductor, and an upper absorption layer 23 disposed on the upper bundle structure layer 22, and the absorption layer 33, the bundle structure layer 12, the reflection layer 15, the upper dielectric layer 24, the upper bundle structure layer 22, and the upper absorption layer 23 are arranged in a one-dimensional lattice.

When the upper bundle structure layer 22 and the upper absorption layer 23 are provided as in Structural Examples 13 to 16 illustrated in FIGS. 14A, 14B, 15A, and 15B, light sources can be placed on both the translucent substrate 11 side and the upper absorption layer 23 side.

Third Embodiment

A third embodiment will now be described with reference to the drawings. In the third embodiment, a reflection layer 15 is formed on the translucent substrate 11 in making the polarizing plate. The identical or equivalent components to those of the first embodiment are referred by the same reference symbols and the descriptions therefor are omitted.

Figure 16A:
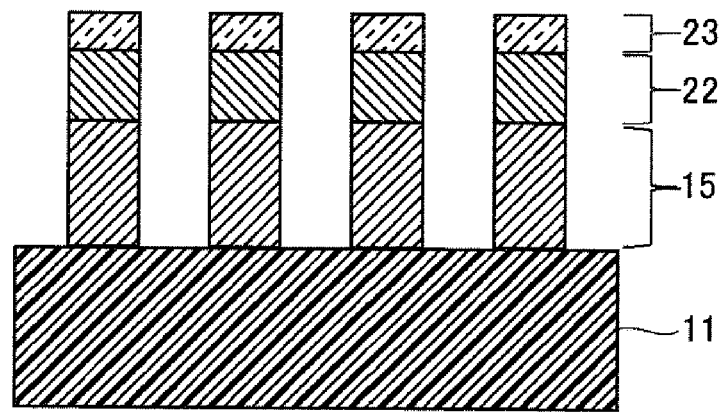
FIG. 16A is a schematic cross-sectional view of a polarizing plate of Structural Example 17.
Figure 16B:
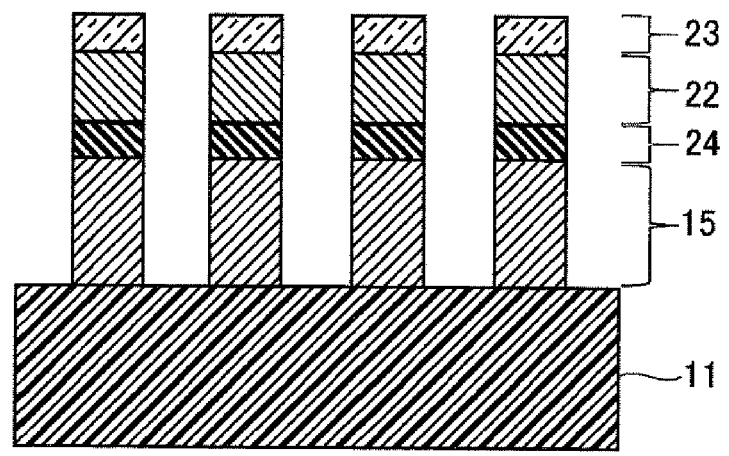
FIG. 16B is a schematic cross-sectional view of a polarizing plate of Structural Example 18.

FIG. 16A is a schematic cross-sectional view of a polarizing plate of Structural Example 17. FIG. 16B is a schematic cross-sectional view of a polarizing plate of Structural Example 18.

The polarizing plate of Structural Example 17 illustrated in FIG. 16A includes a translucent substrate 11 that transmits light in the working band, a reflection layer 15 disposed on the translucent substrate 11 and arranged in a one-dimensional lattice at a pitch smaller than the wavelength of light in the working band, an upper bundle structure layer 22 disposed on the reflection layer 15 and constituted by a columnar sheaf formed of at least one selected from a dielectric, a metal, and a semiconductor, and an upper absorption layer 23 disposed on the upper bundle structure layer 22.

In Structural Example 18, an upper dielectric layer 24 is provided between the reflection layer 15 and the upper bundle structure layer 22 of Structural Example 17. In other words, the polarizing plate of Structural Example 18 illustrated in FIG. 16B includes a translucent substrate 11 that transmits light in the working band, a reflection layer 15 disposed on the translucent substrate 11 and arranged in a one-dimensional lattice at a pitch smaller than the wavelength of light in the working band, an upper dielectric layer 24 disposed on the reflection layer 15 and arranged in a one-dimensional lattice at a pitch smaller than the wavelength of light in the working band, an upper bundle structure layer 22 disposed on the upper dielectric layer 24, constituted by a columnar sheaf formed of at least one selected from a dielectric, a metal, and a semiconductor, and arranged in a one-dimensional lattice at a pitch smaller than the wavelength of light in the working band, and an upper absorption layer 23 disposed on the upper bundle structure layer 22 and arranged in a one-dimensional lattice at a pitch smaller than the wavelength of light in the working band.

In Structural Examples 17 and 18 illustrated in FIGS. 16A and 16B, the positional relationship between the reflection layer and the absorption layer on the substrate is reversed from the polarizing plates of the first and second embodiments. Thus, a light source can be placed on the upper absorption layer 23 side.

Fourth Embodiment

Next, a fourth embodiment is described with reference to the drawings. In the fourth embodiment, an absorption layer is formed within the bundle structure and the bundle structure layer includes at least one layer formed of a metal or a semiconductor. The identical or equivalent components to those of the first embodiment are referred by the same reference symbols and the descriptions therefor are omitted.

Figure 17A:
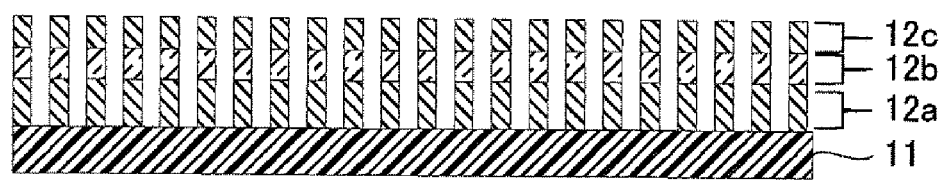
FIG. 17A is a schematic cross-sectional view of a polarizing plate of Structural Example 19.

FIG. 17A is a schematic cross-sectional view of a polarizing plate of Structural Example 19. The polarizing plate of Structural Example 19 illustrated in FIG. 17A includes a translucent substrate 11 that transmits light in the working band, a bundle structure layer 12a disposed on the translucent substrate 11 and constituted by a columnar sheaf formed of a dielectric, a bundle structure layer 12b disposed on the bundle structure layer 12a and constituted by a columnar sheaf formed of at least one selected from a metal and a semiconductor, and a bundle structure layer 12c disposed on the bundle structure layer 12b and constituted by a columnar sheaf formed of a dielectric.

The bundle structure layer 12b includes at least one layer formed of a metal or a semiconductor. Each layer of the bundle structure layer 12b is formed of fine particles containing at least one selected from Si, Ta, Fe, Al, W, Ti, Nb, Ag, Cu, and Au and is formed by oblique deposition as with the bundle structure layers 12a and 12c. In other words, the polarizing plate of Structural Example 19 is obtained by forming on a translucent substrate 11 a bundle structure constituted by a columnar sheaf formed of at least one selected from a dielectric, a metal, and a semiconductor. Although Structural Example 19 can alone be used as a polarizing plate, contrast can be improved by further forming a wire-grid structure including a dielectric layer and a reflection layer on the bundle structure layer 12c.

Fifth Embodiment

Next, a fifth embodiment is described with reference to the drawings. The identical or equivalent components to those of the first embodiment are referred by the same reference symbols and the descriptions therefor are omitted.

Figure 17B:
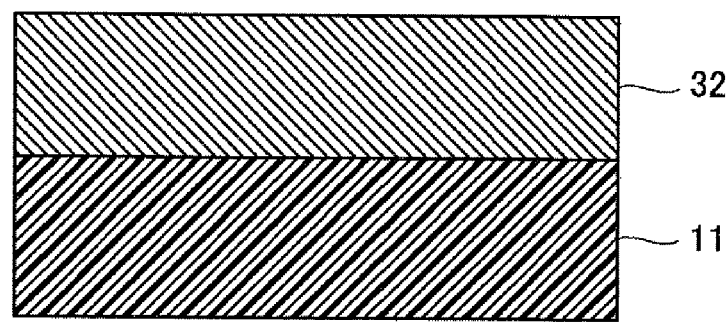
FIG. 17B is a schematic cross-sectional view of a polarizing plate of Structural Example 20.

FIG. 17B is a schematic cross-sectional view of a polarizing plate of Structural Example 20. The polarizing plate of Structural Example 20 illustrated in FIG. 17B includes a translucent substrate 11 that transmits light in the working band and a bundle structure layer 32 disposed on the translucent substrate 11 and constituted by a columnar sheaf formed of an oxide.

The bundle structure layer 32 is formed of an oxide containing at least one selected from Si, Ta, Ti, Al, Mg, La, Zr, and Nb and the oxide is oxygen-deficient due to reduction with hydrogen gas or the like. As a result, the degree of oxidation of the oxide is decreased and the light absorbing ability can be improved. Although Structural Example 20 can be used as a polarizing plate as is, contrast can be improved by forming a wire grid structure including a dielectric layer and a reflection layer on the bundle structure layer 32.

Sixth Embodiment

Next, a sixth embodiment is described with reference to the drawings. As discussed above, excellent optical anisotropy can be obtained from the bundle structure alone. In the sixth embodiment, the bundle structure layer also serves as an absorption layer. The identical or equivalent components to those in the first embodiment are referred by the same reference symbols and the descriptions therefore are omitted.

Figure 18A:
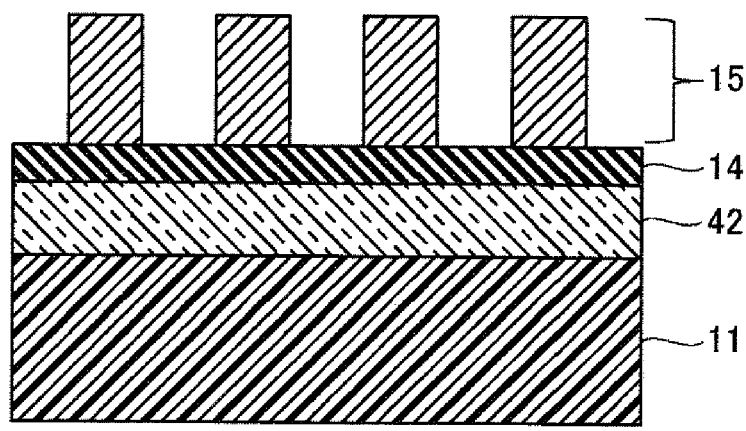
FIG. 18A is a schematic cross-sectional view of a polarizing plate of Structural Example 21.
Figure 18B:
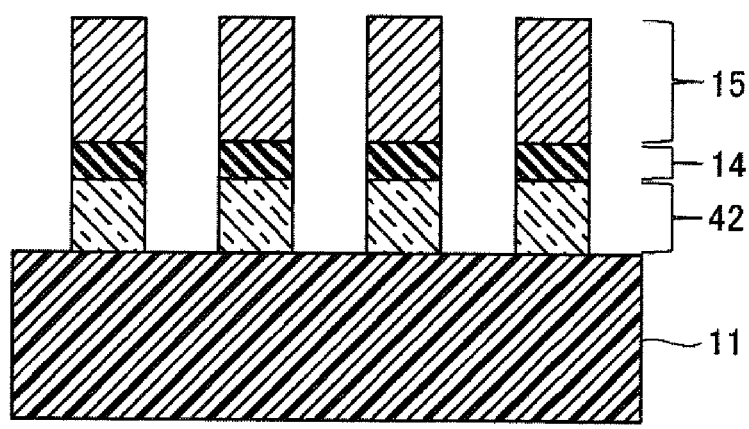
FIG. 18B is a schematic cross-sectional view of a polarizing plate of Structural Example 22.

FIG. 18A is a schematic cross-sectional view of a polarizing plate of Structural Example 21. FIG. 18B is a schematic cross-sectional view of a polarizing plate of Structural Example 22.

The polarizing plate of Structural Example 21 illustrated in FIG. 18A includes a translucent substrate 11 that transmits light in the working band, a bundle structure layer 42 disposed on the translucent substrate 11, constituted by a columnar sheaf formed of at least one selected from a dielectric, a metal, and a semiconductor, and having optical anisotropy, a dielectric layer 14 disposed on the bundle structure layer 42, and a reflection layer 15 disposed on the dielectric layer 14 and arranged in a one-dimensional lattice at a pitch smaller than the wavelength of light in the working band. The bundle structure layer 42 preferably includes at least one layer having optical anisotropy formed of a metal or a semiconductor. Specifically, each layer of the bundle structure layer 42 preferably includes at least one layer formed of fine particles containing at least one selected from Si, Ta, Fe, Al, W, Ti, Nb, Ag, Cu, and Au.

One or both of the bundle structure layer 42 and the dielectric layer 14 are preferably arranged in a one-dimensional lattice at a pitch smaller than the wavelength of light in the working band as with the reflection layer 15.

More preferably, both the bundle structure layer 42 and the dielectric layer 14 are arranged in a one-dimensional lattice at a pitch smaller than the wavelength of light in the working band as with the reflection layer 15. A preferable example thereof is the polarizing plate of Structural Example 22 illustrated in FIG. 18B, in which the polarizing plate includes a translucent substrate 11 that transmits light in the working band, a bundle structure layer 42 disposed on the translucent substrate 11 and constituted by a columnar sheaf formed of at least one selected from a dielectric, a metal, and a semiconductor, a dielectric layer 14 disposed on the bundle structure layer 42, and a reflection layer 15 disposed on the dielectric layer 14, and the bundle structure layer 42, the dielectric layer 14, and the reflection layer 15 are arranged in a one-dimensional lattice. In other words, this polarizing plate has a wire grid structure constituted by protrusions aligned on the translucent substrate 11 at particular intervals and each of the protrusions is constituted by the bundle structure layer 42, the dielectric layer 14, and the reflection layer 15 stacked in that order from the translucent substrate 11 side. As long as the transmission axis transmittance of the bundle structure layer 42 is high and desired optical characteristics are obtained, the bottom of the recesses of the wire grid structure may be the bundle structure layer 42 instead of the translucent substrate 11.

When one or both of the bundle structure layer 42 and the dielectric layer 14 are arranged in a one-dimensional lattice at a pitch smaller than the wavelength of light in the working band as with the reflection layer 15 as described above, contrast (extinction ratio: transmission axis transmittance/absorption axis transmittance) can be improved.

[Structural Examples of Vapor Deposition System]

In producing polarizing plates for large-screens such as televisions, bundle structures with large areas must be prepared. Structural examples of a vapor deposition system that can manufacture large-area bundle structures is described below.

Figure 20A:
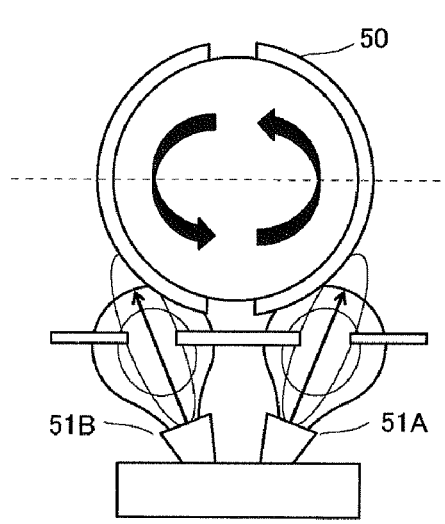
FIG. 20A is a schematic cross-sectional view of a roll-type vapor deposition system of Structural Example 3.
Figure 20B:
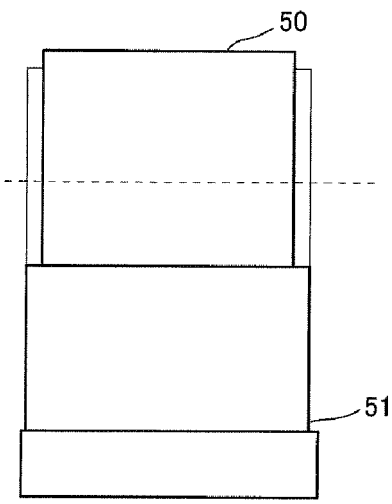
FIG. 20B is a schematic side view of the vapor deposition system of Structural Example 3.
Figure 21A:
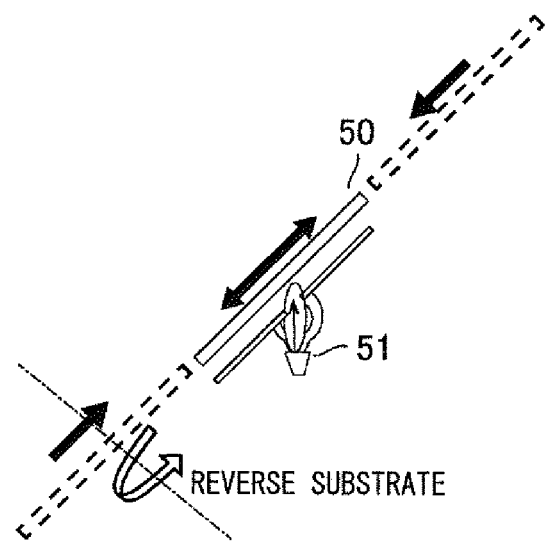
FIG. 21A is a schematic cross-sectional view of a vapor deposition system of Structural Example 4.

FIGS. 19A, 19B, 20, 21A, and 21B respectively illustrate Structural Examples 1 to 5 of vapor deposition systems for manufacturing bundle structures. As illustrated in FIGS. 19A, 19B, 20, and 21B, a vapor deposition system includes an evaporation source 51A and an evaporation source 51B at symmetrical positions with respect to the direction normal of a substrate 50 in two dimensions. Alternatively, as illustrated in FIG. 21A, the system may include one evaporation source 51 and may be configured to turn the substrate 50 around.

Figure 19A:
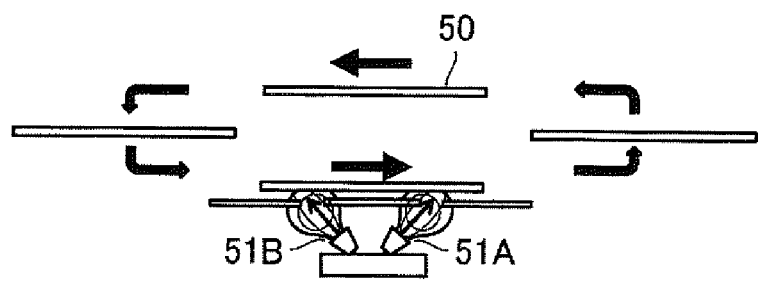
FIG. 19A is a schematic cross-sectional view of a vapor deposition system of Structural Example 1.

The vapor deposition system of Structural Example 1 illustrated in FIG. 19A is configured to move the substrate 50 in one direction indicated by the arrows and operate the evaporation source 51A and the evaporation source 51B simultaneously so that layers formed by the evaporation source 51A and the layers formed by the evaporation source 51B can be alternately stacked on the substrate 50. Alternatively, the vapor deposition system of Structural Example 1 can switch the evaporation source between the evaporation source 51A and the evaporation source 51B every time the substrate 50 is moved in the direction indicated by the arrows so that the layers formed by the evaporation source 51A and the layers formed by the evaporation source 51B can be alternately stacked on the substrate 50. According to the vapor deposition system of Structural Example 1, bundle structures can be formed on four large substrates simultaneously in one batch.

Figure 19B:
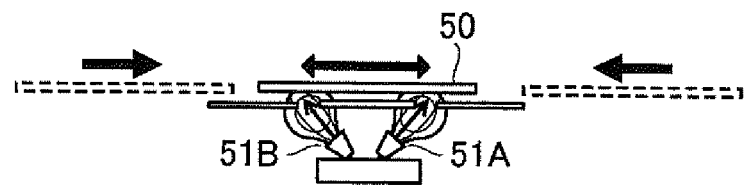
FIG. 19B is a schematic cross-sectional view of a vapor deposition system of Structural Example 2.

The vapor deposition system of Structural Example 2 illustrated in FIG. 19B is configured to move substrate 50 in a reciprocating manner and to switch the evaporation source between the evaporation source 51A and the evaporation source 51B every time the direction in which the substrate 50 is moved is reversed so that the layers formed by the evaporation source 51A and the layers formed by the evaporation source 51B can be alternately stacked on the substrate 50.

FIG. 20A is a cross-sectional view of a roll-type vapor deposition system of Structural Example 3. FIG. 20B is a side view of the vapor deposition system of Structural Example 3. The vapor deposition system of Structural Example 3 illustrated in FIG. 20 is configured to rotate a flexible substrate 50, such as a thin glass or a thin film, and operate the evaporation source 51A and the evaporation source 51B simultaneously so that the layers formed by the evaporation source 51A and the layers formed by the evaporation source 51B can be alternately stacked on the substrate 50.

A vapor deposition system of Structural Example 4 illustrated in FIG. 21A is configured to move the substrate 50 in obliquely upward and downward directions in a reciprocating manner and turn the substrate 50 180° by a reversing mechanism. As a result, deposition in the direction A and deposition in the direction B can be alternately performed on the substrate 50 by using the evaporation source 51 while the substrate 50 is moved in a reciprocating manner, where the direction A and the direction B differ from each other by 180° on an xy plane which is assumed to be the substrate surface in the xyz orthogonal coordinate system.

Figure 21B:
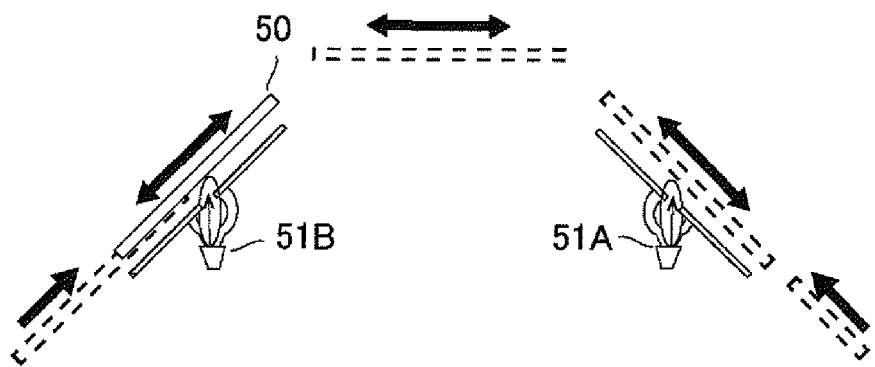
FIG. 21B is a schematic cross-sectional view of a vapor deposition system of Structural Example 5.

The vapor deposition system of Structural Example 5 illustrated in FIG. 21B is configured to move the substrate 50 in obliquely upward and downward directions in a reciprocating manner and operate the evaporation source 51A and the evaporation source 51B simultaneously so that the layers formed by the evaporation source 51A and the layers formed by the evaporation source 51B can be alternately stacked on the substrate 50.

2. Method for Manufacturing Polarizing Plate

A method for manufacturing a polarizing plate according to an embodiment will now be described. Methods for manufacturing the polarizing plates of Structural Example 2 illustrated in FIG. 1B, Structural Example 9 illustrated in FIG. 12A, and Structural Example 20 illustrated in FIG. 17B are described below.

[Method for Manufacturing Polarizing Plate of Structural Example 2]

According to a method for manufacturing a polarizing plate of Structural Example 2, a bundle structure layer 12, an absorption layer 13, a dielectric layer 14, and a reflection layer 15 are sequentially formed on a translucent substrate 11 in this order.

The bundle structure layer 12 is formed by oblique deposition or oblique sputtering. For example, after a dielectric material is obliquely deposited on a transparent substrate in one direction, the transparent substrate is rotated 180° and a dielectric material is obliquely deposited in another direction; this cycle is repeated plural times to obtain a columnar dielectric sheaf.

In order to improve straightness of the columnar dielectric during preparation of the bundle structure layer 12, it is effective to place nanoparticles on the substrate or form a texture, such as a one-dimensional lattice, on the substrate.

Figure 22A:
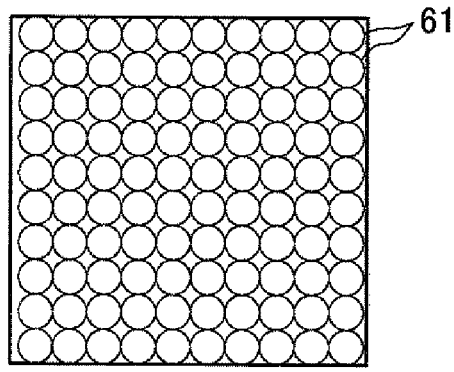
FIG. 22A is a plan view of nanoparticles aligned on a substrate.
Figure 22B:
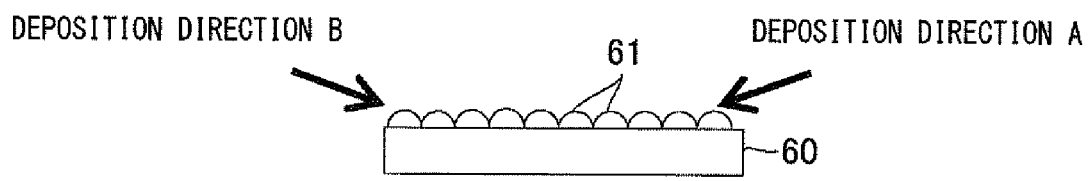
FIG. 22B is a cross-sectional view illustrating the state at the start of oblique deposition.
Figure 22C:
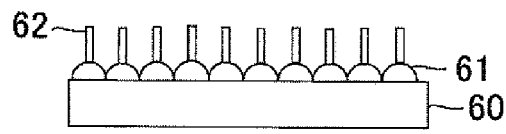
FIG. 22C is a cross-sectional view illustrating the state after oblique deposition.
Figure 22D:
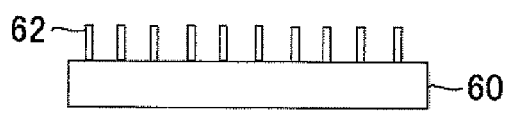
FIG. 22D is a cross-sectional view of a bundle structure after annealing.

FIG. 22A is a plan view of nanoparticles aligned on a substrate. FIG. 22B is a cross-sectional view illustrating the state at the start of oblique deposition. FIG. 22C is a cross-sectional view illustrating the state after oblique deposition. FIG. 22D is a cross-sectional view of a bundle structure after annealing.

As illustrated in FIG. 22A, nanoparticles 61 having a diameter smaller than the wavelength of the working band are aligned on a substrate 60 or a texture. The nanoparticles 61 may be silica, ferritin, or polystyrene, for example. Next, as illustrated in FIG. 22B, assuming that the substrate surface is an xy plane in the xyz orthogonal coordinate system, inorganic fine particles are obliquely deposited alternately in two directions 180° different from each other on the xy plane. Then as illustrated in FIG. 22C, a bundle structure layer constituted by a sheaf of columns 62 formed of inorganic fine particles is formed on the nanoparticles 61. When silica, ferritin, polystyrene, or the like is used, a reduction treatment or a heat treatment is performed after formation of the bundle structure layer so that the nanoparticles 61 disappear as illustrated in FIG. 22D. The portion formed by the nanoparticles 61 is thin relative to the deposited film and disappearance of the nanoparticles 61 has no influence. Performing a reduction treatment can improve the degree of polarization. Alternatively, a bundle structure layer may be formed first and then processed into a grid shape having a pitch smaller than the working band by photolithography and etching.

Figure 23A:
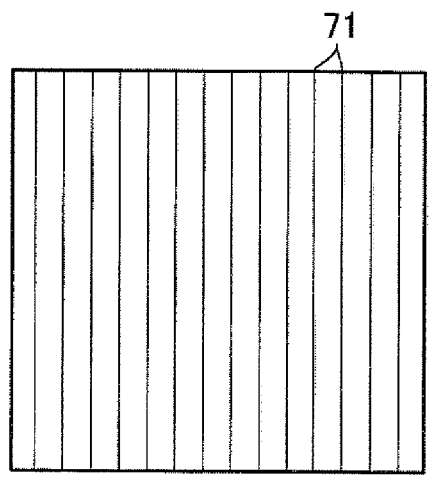
FIG. 23A is a plan view of a texture formed on a substrate.
Figure 23B:
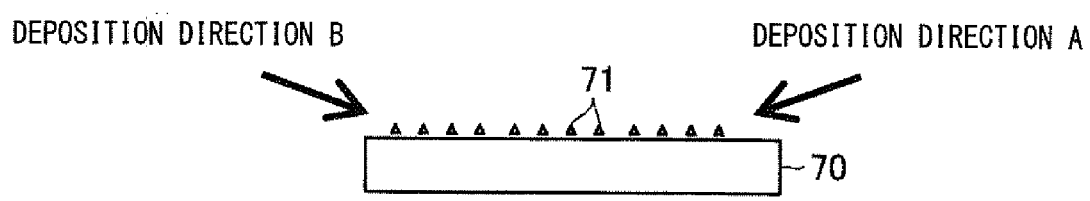
FIG. 23B is a cross-sectional view of the state at the start of oblique deposition.
Figure 23C:
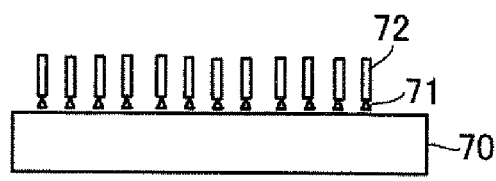
FIG. 23C is a cross-sectional view of the state after oblique deposition.

FIG. 23A is a plan view of a texture formed on a substrate. FIG. 23B is a cross-sectional view of the state at the start of oblique deposition. FIG. 23C is a cross-sectional view of the state after oblique deposition. As illustrated in FIG. 23A, protrusions 71 are arranged in a one-dimensional lattice at a pitch smaller than the wavelength of light in the working band to form a texture on a substrate 70. Next, as illustrated in FIG. 23B, assuming the substrate surface to be an xy plane in the xyz orthogonal coordinate system, inorganic fine particles are obliquely deposited alternately in two directions 180° different from each other on the xy plane. Then as illustrated in FIG. 23C, a bundle structure layer constituted by a sheaf of columns 72 formed of inorganic fine particles is obtained on the protrusions 71. Alternatively, the bundle structure layer may be formed first and then processed into a grid-shape by photolithography and etching at a pitch not greater than the working band.

Placing nanoparticles on the substrate and forming a texture such as a one-dimensional lattice on a substrate affect the positions where particles are deposited. Thus, straightness of the columns formed of inorganic fine particles can be enhanced and the polarization property can be improved.

In manufacturing the bundle structure layer 12, oblique deposition may be combined with ion etching to improve the straightness of columns formed of at least one selected from a dielectric, a metal, and a semiconductor. Specifically, assuming the substrate surface to be an xy plane in the xyz orthogonal coordinate system, inorganic fine particles are obliquely deposited alternately in two directions 180° different from each other on the xy plane so as to form a bundle structure layer 12, and then ion etching is conducted in a direction orthogonal to a straight line on the xy plane, the straight line extending in the two directions 180° different from each other. Ar ions and Xe ions are used for etching. According to this ion etching, pitch intervals can be adjusted by controlling etching time and ion irradiation dose, and straightness can be improved.

The bundle structure layer 12 is preferably formed of inorganic fine particles that form a dielectric layer and one or more metal or semiconductor layers. As long as desired contrast (extinction ratio: transmission axis transmittance/absorption axis transmittance) can be obtained, this bundle structure layer 12 can alone function as a polarizing plate as in the fourth embodiment. Alternatively, a wire grid structure may be formed on the bundle structure to improve contrast.

Oblique deposition may be combined with ion etching to obtain a bundle structure that includes one layer selected from a dielectric layer, a metal layer, and a semiconductor layer. Such a bundle structure has high column regularity and offers excellent optical characteristics when used in a polarizing plate or a waveplate.

The absorption layer 13 is formed by a vapor deposition technique or a sputtering technique. Specifically, the translucent substrate 11 is placed facing a target, argon gas particles are collided against the target, and the target components scattered by the impact are caused to deposit on the substrate to obtain an absorption layer 13.

The dielectric layer 14 and the reflection layer 15 can be formed by a typical vacuum film-forming technique such as a sputtering technique, a vapor phase epitaxy technique, or a vapor deposition technique, or a sol-gel technique (for example, spin-coating a substrate with a sol and heat-curing the sol into gel).

After the bundle structure layer 12, the absorption layer 13, the dielectric layer 14, and the reflection layer 15 are sequentially formed on the translucent substrate 11 in that order, a lattice-shaped mask pattern is formed on the reflection layer 15 by nano-imprinting, photolithography, or the like, and protrusions arranged in a lattice are formed by dry etching. Examples of the gas used in dry etching include $Ar/O_2$ for forming an antireflective coating (BARC), $Cl_2/BCl_3$ for AlSi, and $CF_4/Ar$ for $SiO_2$, Si, and Ta. Etching conditions (gas flow, gas pressure, power, substrate cooling temperature) are optimized to form a lattice pattern having high perpendicularity. The width (X axis direction) of the absorption layer 13 can be adjusted by adjusting etching conditions.

When Al or AlSi is used to form the reflection layer 15, a material that can be etched with fluorine is preferably selected to form the absorption layer 13 and the dielectric layer 14. In this manner, high etching selectivity ratio can be achieved and the design range of the film thickness of the absorption layer 13 and the dielectric layer 14 can be widened, which is advantageous in constructing a process.

As long as changes in optical characteristics have no effect in practice, a protective film formed of an oxide such as $SiO_2$ can be deposited on the top to improve reliability such as moisture resistance.

[Method for Manufacturing Polarizing Plate of Structural Example 9]

According to a method for manufacturing a polarizing plate of Structural Example 9 illustrated in FIG. 12A, an absorption layer 33 and a bundle structure layer 12 constituted by a columnar sheaf formed of at least one selected from a dielectric, a metal, and a semiconductor are formed on the translucent substrate 11 in that order, etching is performed by using the bundle structure layer 12 as a mask, and the absorption layer 33 is formed into fine particles. As a result, optical characteristics of the absorption layer 33 can be controlled.

Since the bundle structure layer 12 is constituted by a columnar sheaf formed of at least one selected from a dielectric, a metal, and a semiconductor, the bundle structure layer 12 can be used as a mask in etching the underlying absorption layer 33. The type of etching is appropriately selected based on the materials for the absorption layer 33 and the bundle structure layer 12, etc. For example, dry etching with a gas such as $Cl_2/BCl_3$ or $CF_4/Ar$ is preferable.

Although Structural Example 9 illustrated in FIG. 12A may alone be used as a polarizing plate, the bundle structure layer 12 may be processed into a grid shape at a pitch not greater than the working band after formation of the bundle, as illustrated by Structural Example 10. Alternatively, a wire grid structure may be formed as in Structural Examples 11 and 12.

[Method for Manufacturing Polarizing Plate of Structural Example 20]

According to a method for manufacturing a polarizing plate of Structural Example 20 illustrated in FIG. 17B, a bundle structure layer disposed on the translucent substrate 11 and constituted by a columnar oxide sheaf is reduced to form a bundle structure layer 32 illustrated in FIG. 17B. As a result, the degree of oxidation of the oxide can be decreased and the light-absorbing ability can be improved.

An example of the reduction of the bundle structure layer is reduction using hydrogen gas or the like. For hydrogen reduction, a highly heat-resistant transparent substrate such as a quartz substrate is preferably used as the translucent substrate 11.

EXAMPLES

4. Examples

Examples of the present invention will now be described. In Example 1, a polarizing plate of Structural Example 2 illustrated in FIG. 1B was prepared. In Example 2, a polarizing plate of Structural Example 19 illustrated in FIG. 17A was prepared. In Example 3, a polarizing plate of Structural Example 9 illustrated in FIG. 12A was prepared. In Example 4, a polarizing plate of Structural Example 20 illustrated in FIG. 17B was prepared. In Example 5, a polarizing plate of Structural Example 2 illustrated in FIG. 1B was prepared. In Example 6, a polarizing plate of Structural Example 20 illustrated in FIG. 17B was prepared. The present invention is not limited to these Examples.

Figure 24:
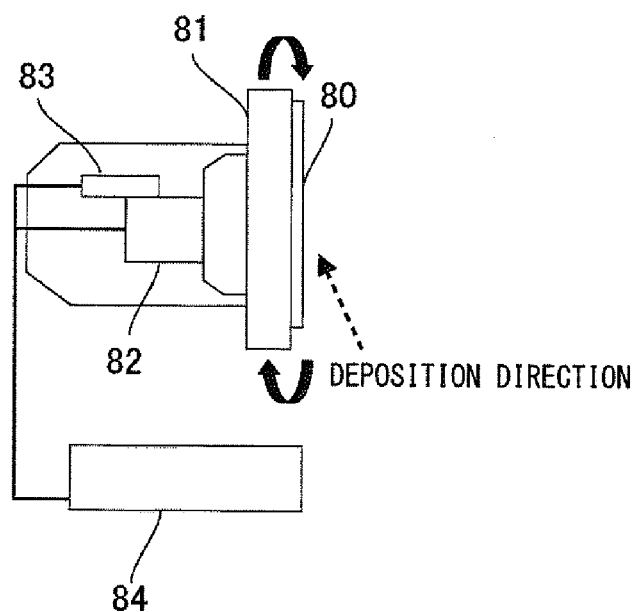
FIG. 24 is a schematic diagram of a vapor deposition system used in Examples.

FIG. 24 is a schematic diagram of a vapor deposition system used in Examples. This vapor deposition system includes a substrate stage 81 that holds a substrate 80, a stepping motor 82 that rotates the substrate stage 81, a sensor 83 that detects the position of rotation, and a controller 84 that controls the stepping motor based on the position of the rotation. The vapor deposition system is equipped with one evaporation source and is configured to rotate the substrate stage 81 180° every time one layer is formed so that inorganic fine particles can be deposited and a bundle structure layer can be formed.

Example 1

First, 25 nm of $Ta_2O_5$ was deposited on a glass substrate by oblique deposition to form columns that constituted a bundle structure layer. Next, 15 nm of Ta was deposited on the bundle structure layer by sputtering to form an absorption layer. Then 50 nm of $SiO_2$ was deposited on the absorption layer by sputtering to form a dielectric layer. Then 60 nm of Al was deposited on the dielectric layer by sputtering to form a reflection layer. A wire grid structure having a pitch of about 150 nm was formed by lithographic patterning and etching to obtain a polarizing plate of Example 1.

Figure 25:
FIG. 25 is a SEM photograph of a polarizing plate of Example 1.

FIG. 25 is a SEM photograph of a polarizing plate of Example 1. The SEM photograph of FIG. 25 indicates that layers down to and including the absorption layer had been removed by etching and that a wire grid structure in which protrusions each constituted by the absorption layer, the dielectric layer, and the reflection layer were arranged in a one-dimensional lattice was formed on the bundle structure layer.

Figure 26A:
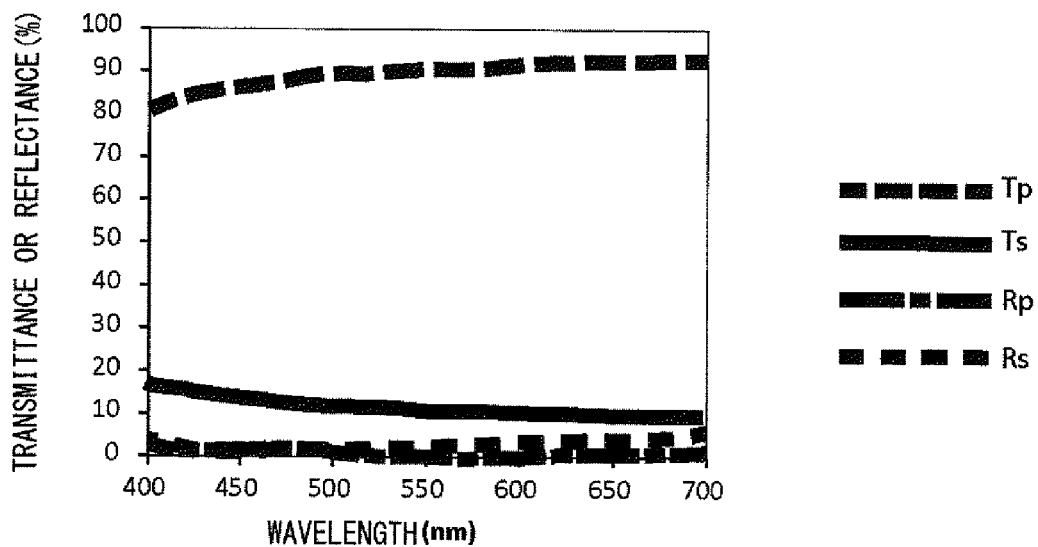
FIG. 26A is a graph indicating optical characteristics of the polarizing plate of Example 1.
Figure 26B:
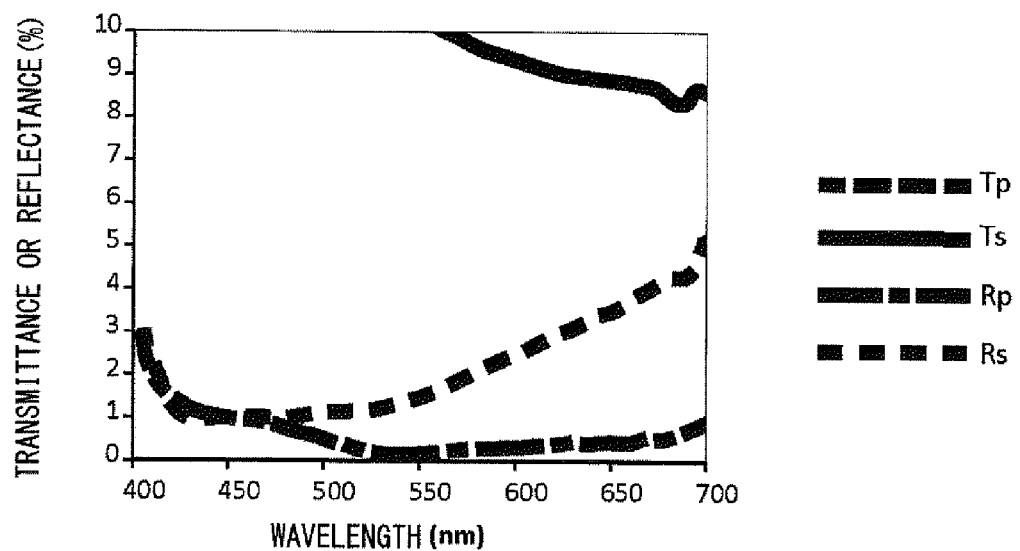
FIG. 26B is a graph indicating the reflectance of the polarizing plate of Example 1.
Figure 27A:
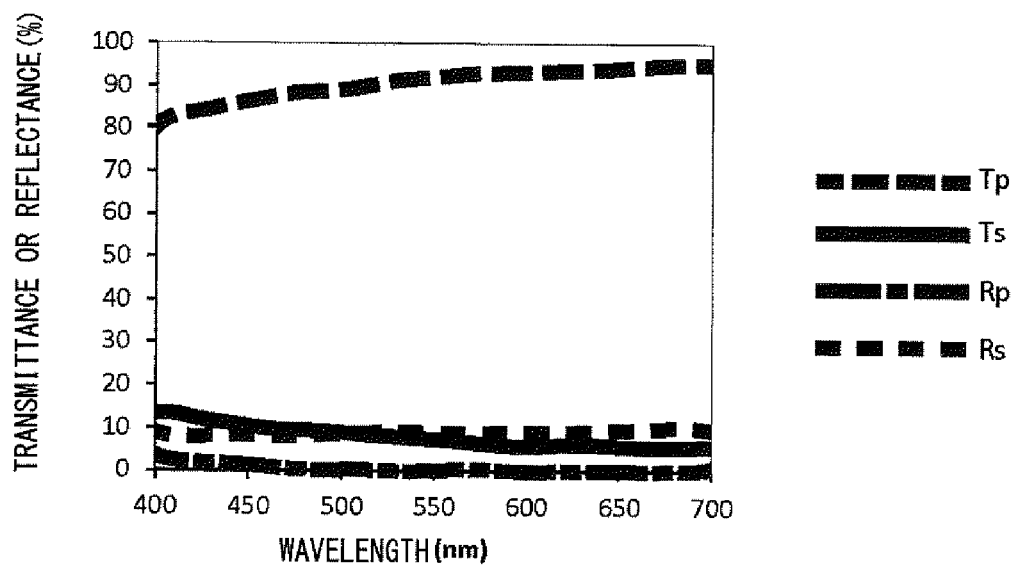
FIG. 27A is a graph indicating optical characteristics of a polarizing plate of Comparative Example.
Figure 27B:
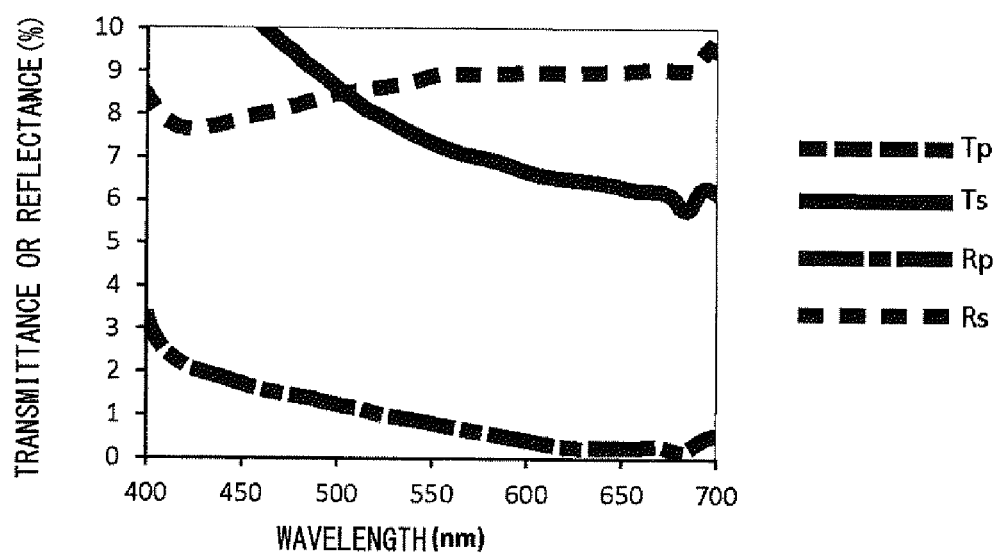
FIG. 27B is a graph indicating the reflectance of the polarizing plate of Comparative Example.

FIG. 26A is a graph indicating optical characteristics of the polarizing plate of Example 1. FIG. 26B is a graph indicating the reflectance of the polarizing plate of Example 1. FIG. 27A is a graph indicating optical characteristics of a polarizing plate of Comparative Example. FIG. 27B is a graph indicating the reflectance of the polarizing plate of Comparative Example. The polarizing plate of Comparative Example was prepared by depositing 50 nm of $SiO_2$, 20 nm of Ta, 50 nm of $SiO_2$, and 60 nm of Al sequentially on a glass substrate and forming a wire grid structure having a pitch of about 150 nm by lithographic patterning and etching as in Example 1. The polarizing plate of Comparative Example had the thickness of Ta adjusted so that the transmission axis transmittance in the short wavelength range was substantially same as that of the polarizing plate of Example 1.

Graphs of FIGS. 26B and 27B indicate that the polarizing plate of Example 1 had the reflectance significantly decreased while other optical characteristics remained unchanged compared to the polarizing plate of Comparative Example 1. The polarizing plate of Example 1 had a reflectance of 6% or less over the entire measured wavelength range and became compatible with a wide wavelength range. The polarizing plate of Example 1 had a contrast (extinction ratio: transmission axis transmittance/absorption axis transmittance) of about 9. If an improved contrast is desirable, the thickness of the Al layer may be increased so that the contrast is increased.

Example 2

First, 450 nm of $SiO_2$ was obliquely deposited to form columns at a period of 15 nm, thereby constituting a bundle structure layer. Then 15 nm of Al was deposited on the bundle structure layer by oblique deposition to form an absorption layer. Then 150 nm of $SiO_2$ was deposited on the absorption layer by oblique deposition to form an upper bundle structure layer. Thus, a polarizing plate of Example 2 was made.

Figure 28:
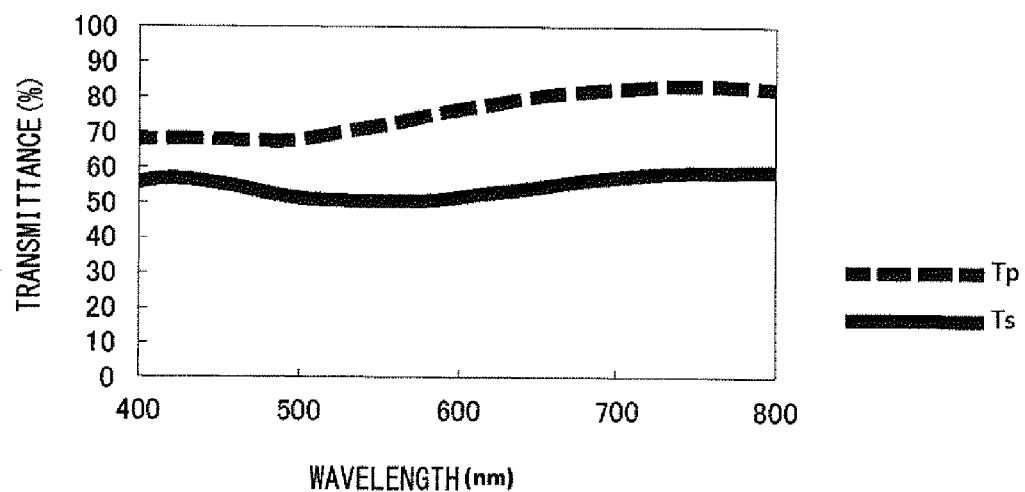
FIG. 28 is a graph indicating optical characteristics of the polarizing plate of Example 2.
Figure 29:
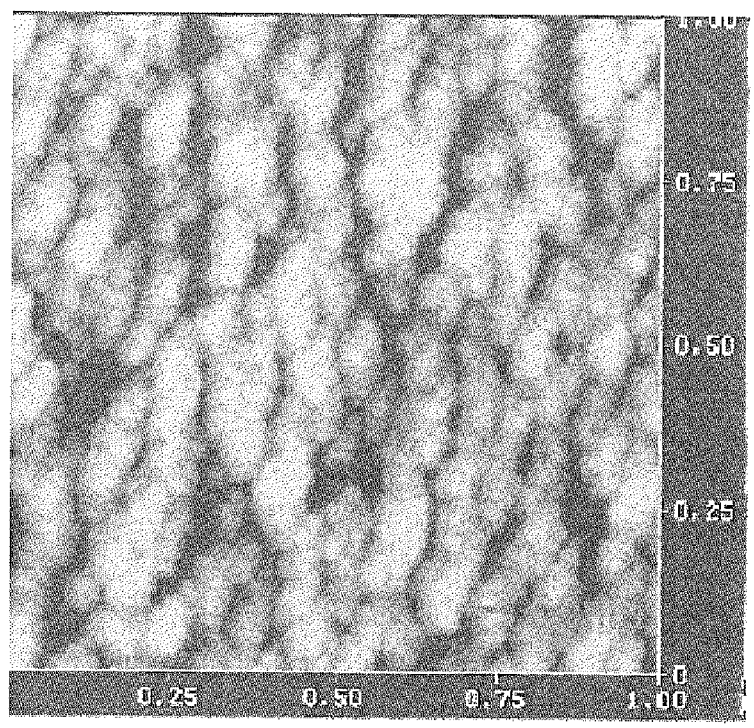
FIG. 29 is an AFM photograph of a surface of the polarizing plate of Example 2.

FIG. 28 is a graph indicating optical characteristics of the polarizing plate of Example 2. FIG. 29 is an AFM photograph of a surface of the polarizing plate of Example 2. The graph in FIG. 28 indicates that the polarizing plate of Example 2 exhibits a polarization property throughout the entire visible light range.

Example 3

First, 20 nm of Al was deposited on a glass substrate by sputtering to form an absorption layer. Then 50 nm of $Ta_2O_5$ was deposited on the absorption layer by oblique deposition to form columns that constituted a bundle structure layer. The absorption layer was dry-etched by using the bundle structure as a mask using $CF_4$/Ar gas to prepare a polarizing plate of Example 3.

Figure 30A:
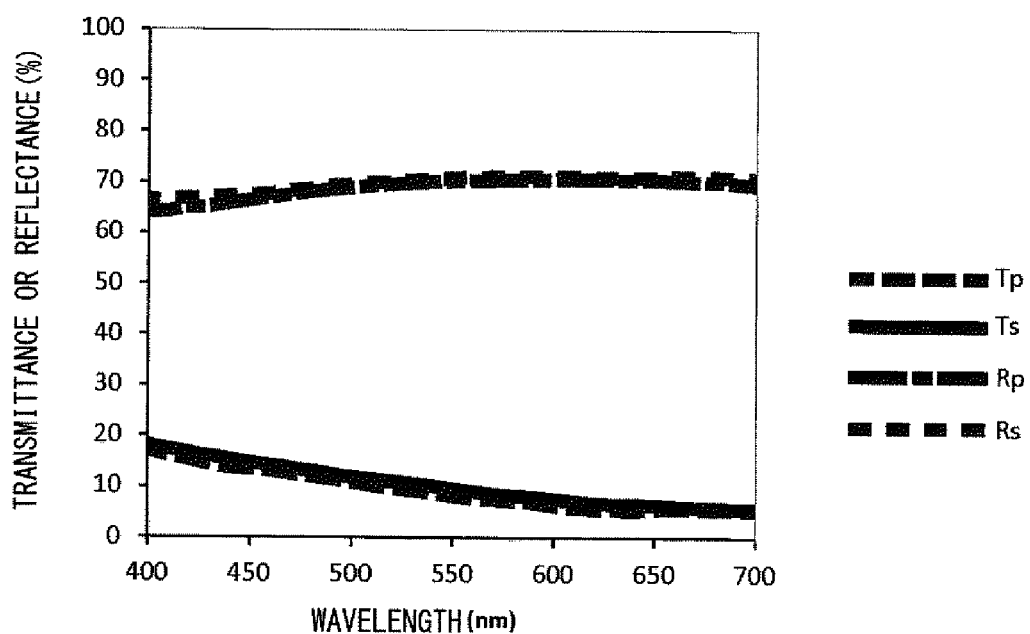
FIG. 30A is a graph indicating optical characteristics of the polarizing plate of Example 3 before etching.
Figure 30B:
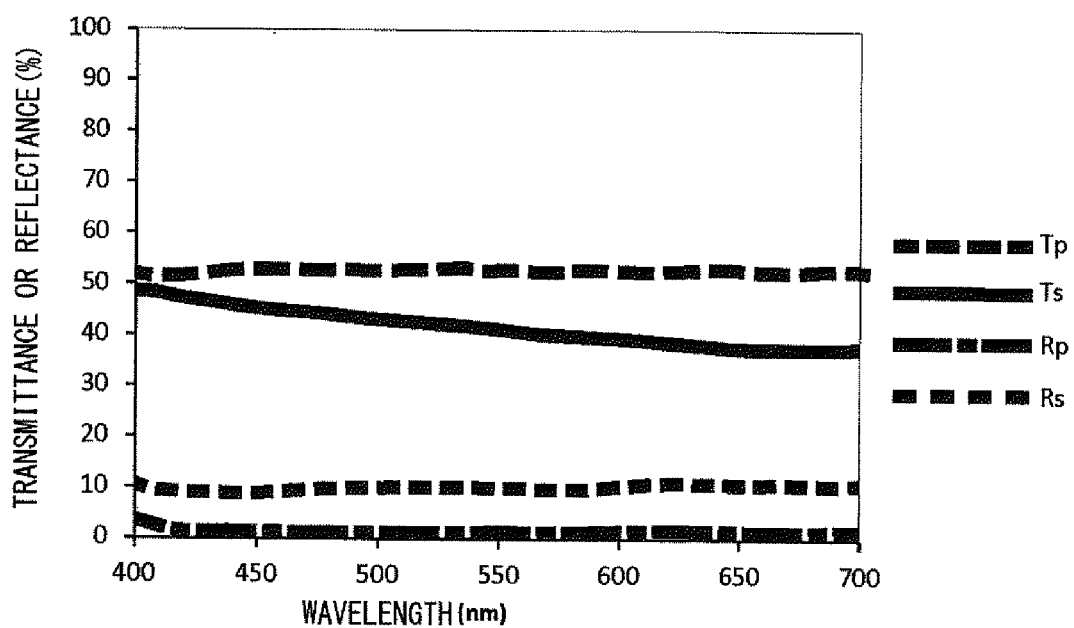
FIG. 30B is a graph indicating optical characteristics of the polarizing plate of Example 3 after etching.
Figure 31:
FIG. 31 is a SEM photograph of a surface of the polarizing plate of Example 3.

FIG. 30A is a graph indicating optical characteristics of the polarizing plate of Example 3 before etching. FIG. 30B is a graph indicating optical characteristics of the polarizing plate of Example 3 after etching. FIG. 31 is a SEM photograph of a surface of the polarizing plate of Example 3. Graphs in FIGS. 30A and 30B indicate that a polarizing characteristic is obtained by etching the absorption layer.

Example 4

First, 2000 nm of $Ta_2O_5$ was deposited on a glass substrate by oblique deposition to form columns that constituted a bundle structure layer. The bundle structure layer was reduced in a hydrogen reduction furnace at a hydrogen concentration of 7% at 400° C. to prepare a polarizing plate of Example 4.

Figure 32:
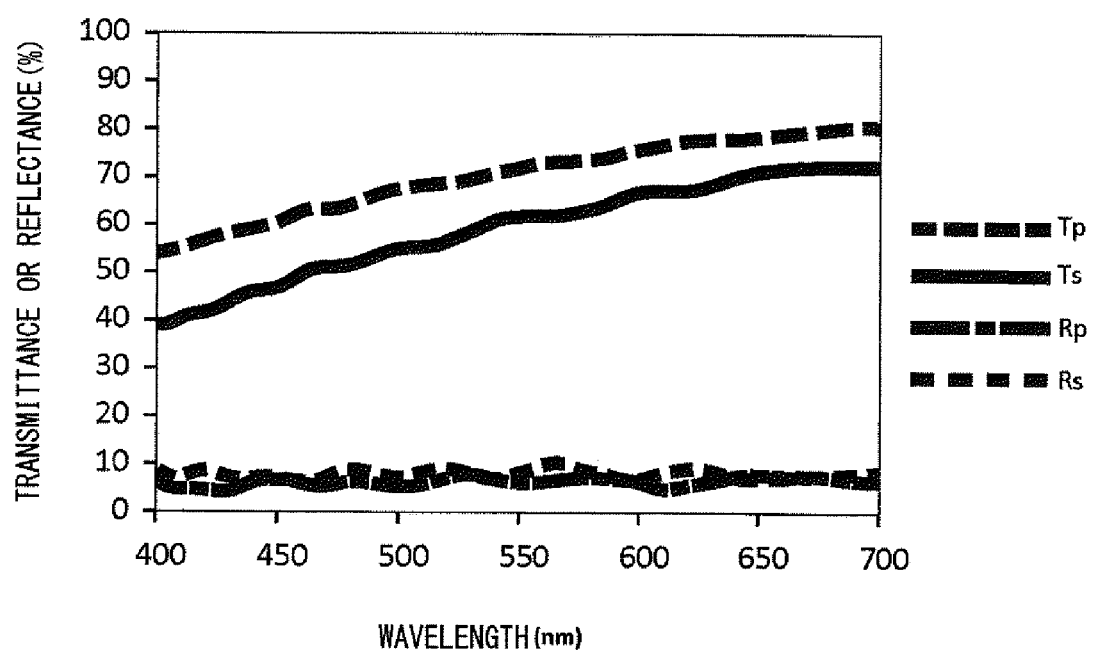
FIG. 32 is a graph indicating optical characteristics of the polarizing plate of Example 4.

FIG. 32 is a graph indicating optical characteristics of the polarizing plate of Example 4. The graph in FIG. 32 indicates that the light-absorbing ability can be improved by reducing the bundle structure layer and thereby decreasing the degree of oxidation of the oxide constituting the bundle structure layer.

Example 5

In Example 5, a polarizing plate that included a double-layered absorption layer was prepared. First, 35 nm of $Ta_2O_5$ was deposited on a glass substrate by oblique deposition to form columns that constituted a bundle structure layer. Then 10 nm of Ta was deposited on the bundle structure layer by sputtering to form a first absorption layer. Then 15 nm of FeSi (Fe=5 atom %) was deposited on the first absorption layer by sputtering to form a second absorption layer. Then 30 nm of $SiO_2$ was deposited on the second absorption layer by sputtering to form a dielectric layer. Then 60 nm of Al was deposited on the dielectric layer by sputtering to form a reflection layer. A wire grid structure having a pitch of about 150 nm was formed by lithographic patterning and etching to prepare a polarizing plate of Example 5.

Figure 33:
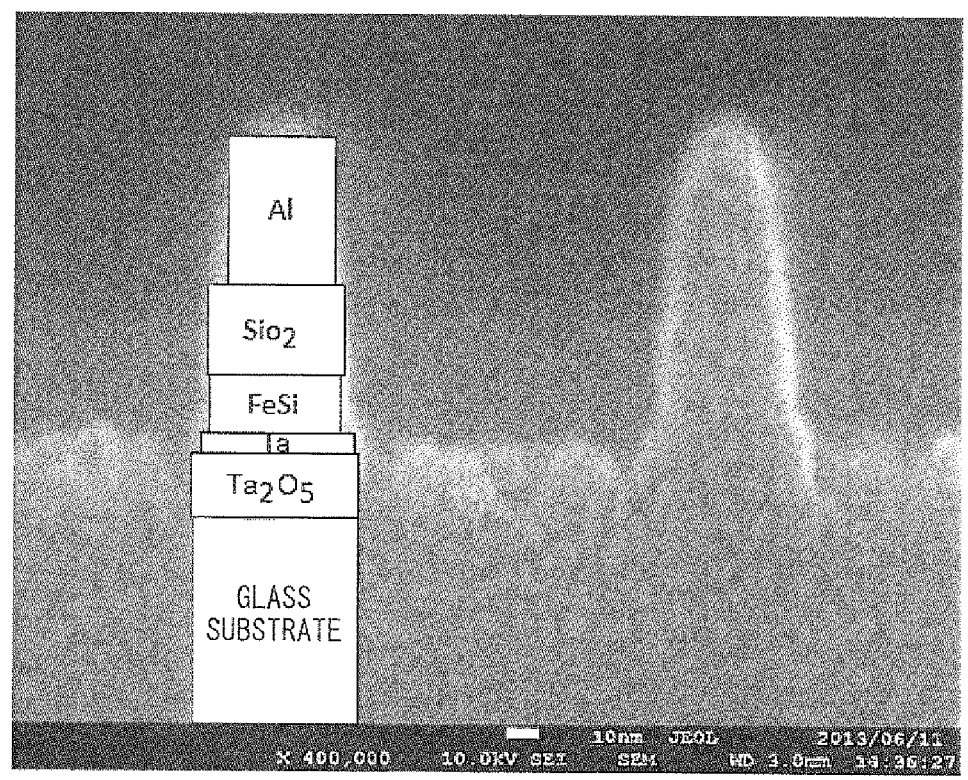
FIG. 33 is a SEM photograph of a cross section of the polarizing plate of Example 5.
Figure 34A:
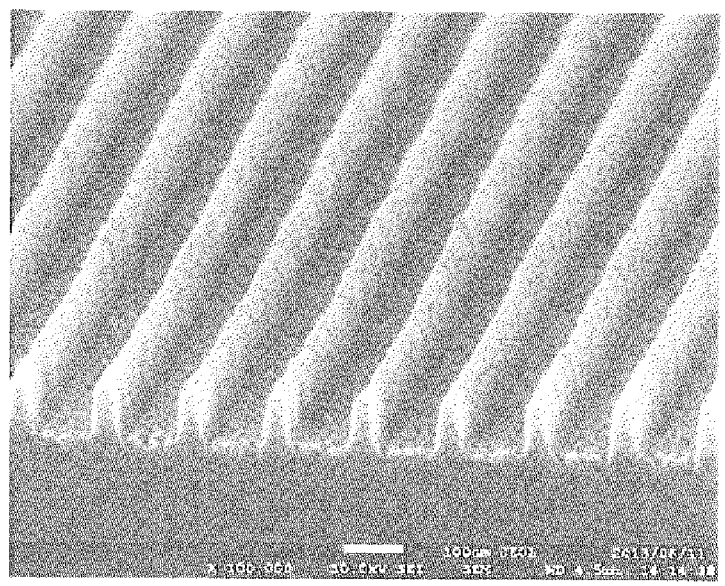
FIG. 34A is a SEM photograph of a perspective cross-section of the polarizing plate of Example 5.
Figure 34B:
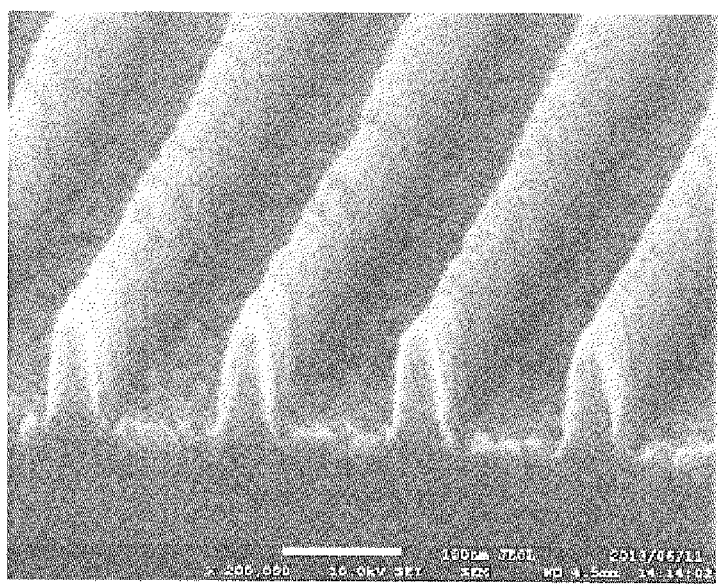
FIG. 34B is a SEM photograph blowing up a part of FIG. 34A.

FIG. 33 is a SEM photograph of a cross section of the polarizing plate of Example 5. FIG. 34A is a SEM photograph of a perspective cross-section of the polarizing plate of Example 5. FIG. 34B is a SEM photograph blowing up a part of FIG. 34A. The SEM photographs of FIGS. 33 and 34 indicate that the layers down to the first dielectric layer had been removed and a wire grid structure in which protrusions each constituted by the first dielectric layer, the second dielectric layer, and the reflection layer are arranged in a one-dimensional lattice was formed on the bundle structure layer.

Figure 35A:
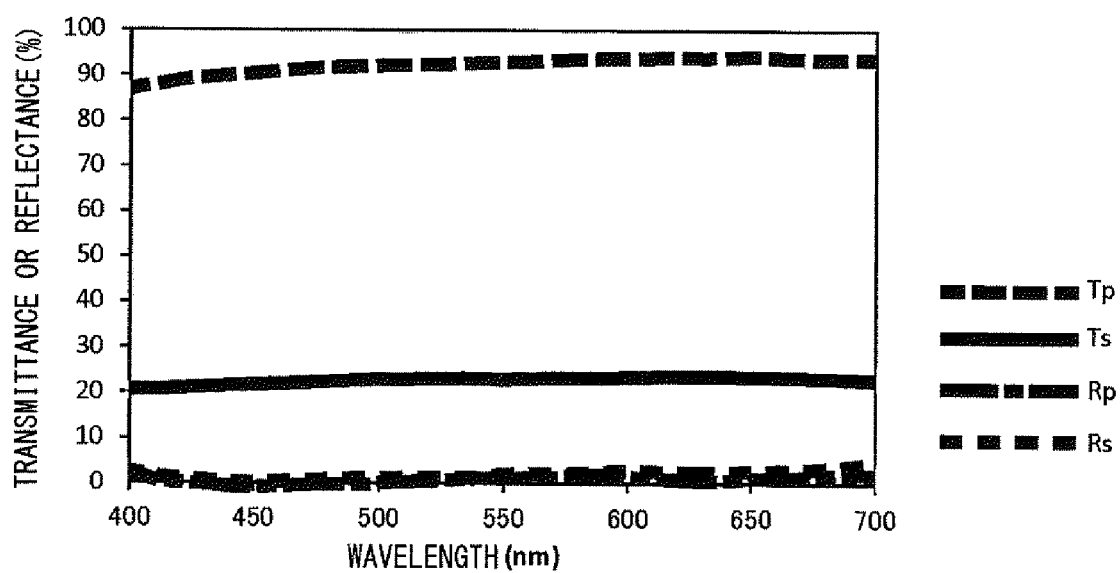
FIG. 35A is a graph indicating optical characteristics of the polarizing plate of Example 5.
Figure 35B:
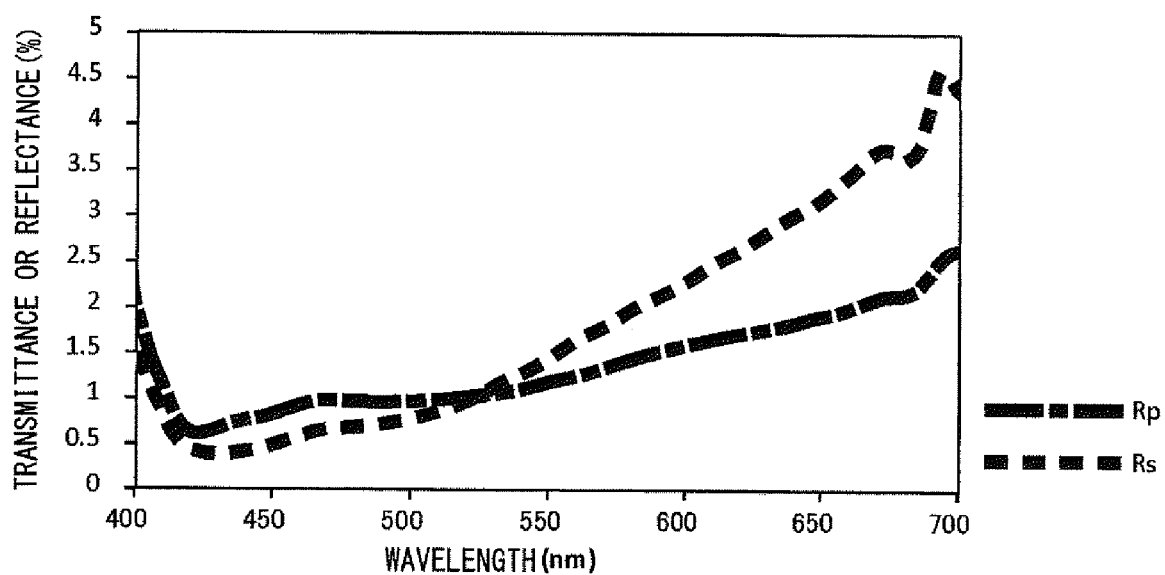
FIG. 35B is a graph indicating the reflectance of the polarizing plate of Example 5.

FIG. 35A is a graph indicating optical characteristics of the polarizing plate of Example 5. FIG. 35B is a graph indicating the reflectance of the polarizing plate of Example 5. As with Example 1 illustrated in FIG. 26, Example 5 exhibited a low reflectance over a wide wavelength range, and the transmittance was higher than Example 1. This indicates that since two or more absorption layers are provided, the optical characteristics are more easily adjustable and high transmittance and low reflectance can be obtained.

Example 6

In example 6, oblique deposition was combined with ion etching to prepare a columnar bundle structure layer formed of an oxide with improved straightness, and the light-absorbing ability was improved by a reduction treatment.

First, 200 nm of $Ta_2O_5$ was deposited by using the vapor deposition system illustrated in FIG. 24 on a glass substrate by oblique deposition to form columns that constituted a bundle structure layer. Then Ar ion beams were applied in a direction parallel to the deposition direction and from a position 70° slanted from the line normal to the substrate surface. The application time was 90 seconds and 180 seconds.

Figure 36A:
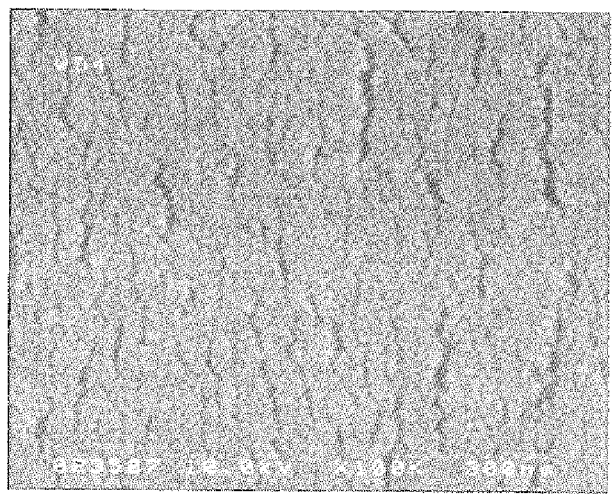
FIG. 36A is a SEM photograph of a surface of the bundle structure after formation.
Figure 36B:
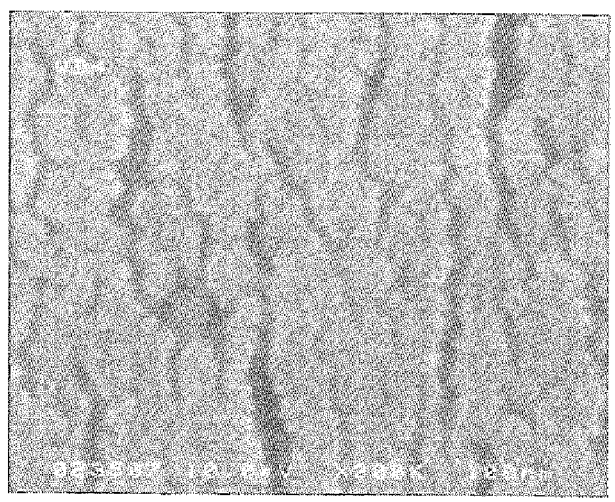
FIG. 36B is a SEM photograph blowing up part of FIG. 36A.
Figure 37A:
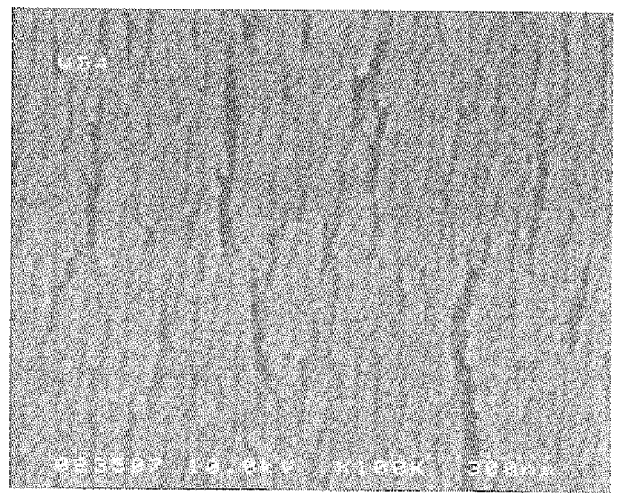
FIG. 37A is a SEM photograph of the surface of the bundle structure after 90 seconds of irradiation with an Ar ion beam.
Figure 37B:
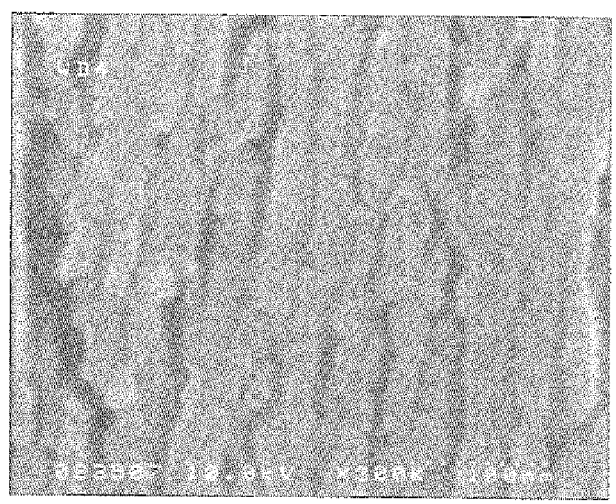
FIG. 37B is a SEM photograph blowing up part of FIG. 37A.
Figure 38A:
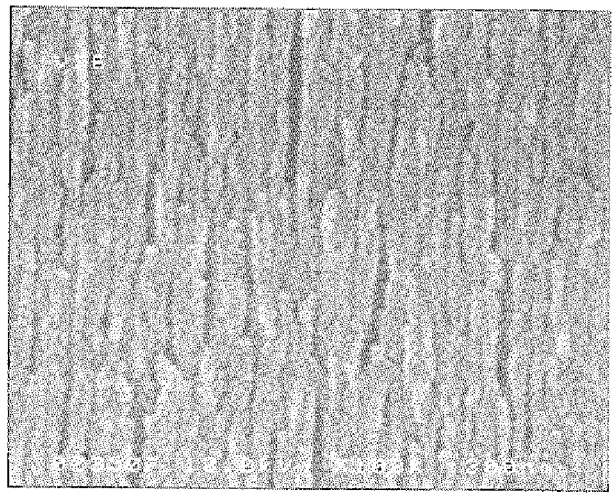
FIG. 38A is a SEM photograph of the surface of the bundle structure after 180 seconds of irradiation with an Ar ion beam.
Figure 38B:
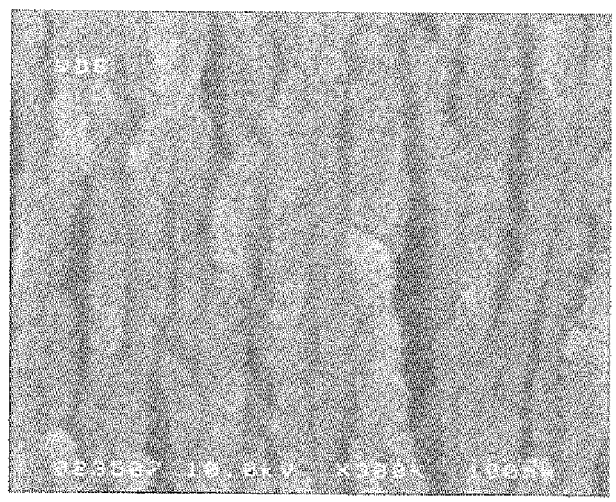
FIG. 38B is a SEM photograph blowing up part of FIG. 38A.

FIG. 36A is a SEM photograph of a surface of the bundle structure after formation, and FIG. 36B is a SEM photograph blowing up part of FIG. 36A. FIG. 37A is a SEM photograph of the surface of the bundle structure after 90 seconds of irradiation with an Ar ion beam. FIG. 37B is a SEM photograph blowing up part of FIG. 37A. FIG. 38A is a SEM photograph of the surface of the bundle structure after 180 seconds of irradiation with an Ar ion beam. FIG. 38B is a SEM photograph blowing up part of FIG. 38A. These SEM photographs indicate that irradiation with the Ar ion beam significantly improves grid straightness.

Figure 39A:
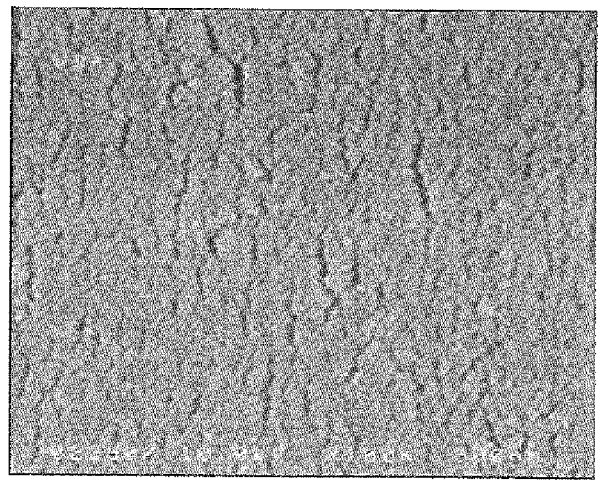
FIG. 39A is a SEM photograph of the surface of the bundle structure irradiated with an Ar ion beam for 0 second and FIG. 39B is a SEM photograph blowing up part of FIG. 39A.
Figure 39B:
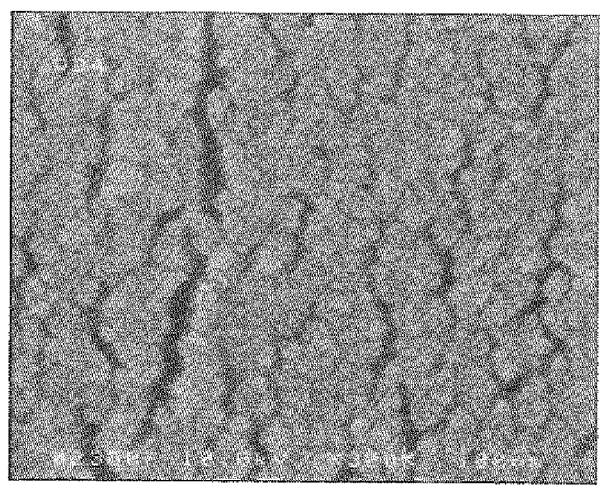
Figure 40:
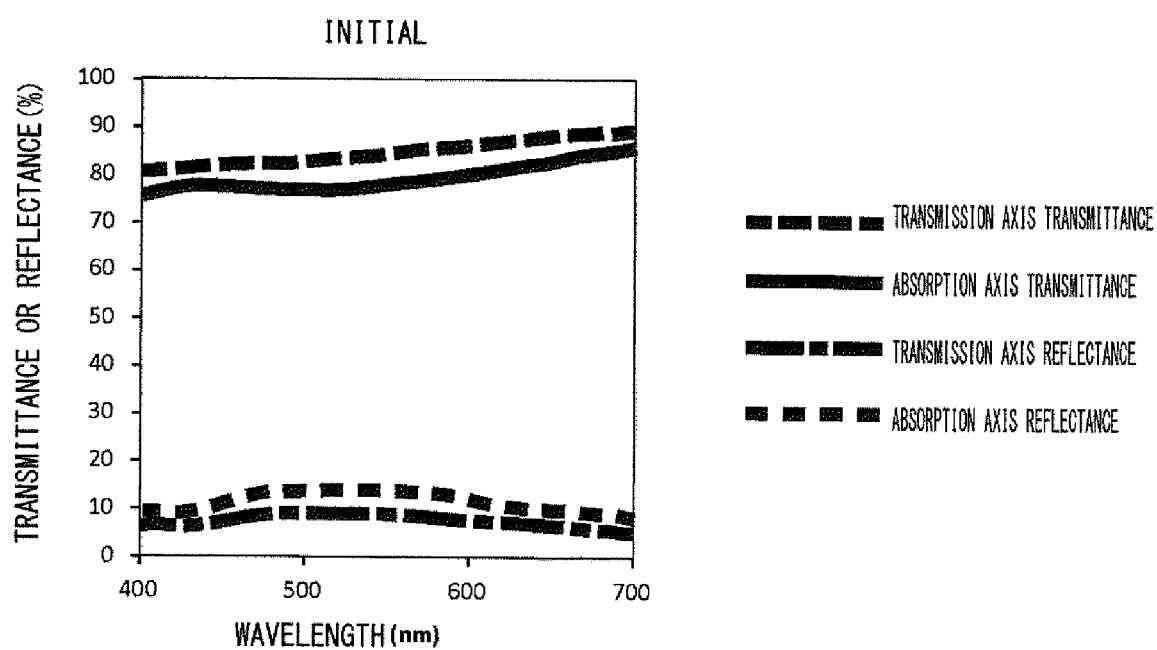
FIG. 40 is a graph indicating optical characteristics of the bundle structure irradiated with an Ar ion beam for 0 second.
Figure 41A:
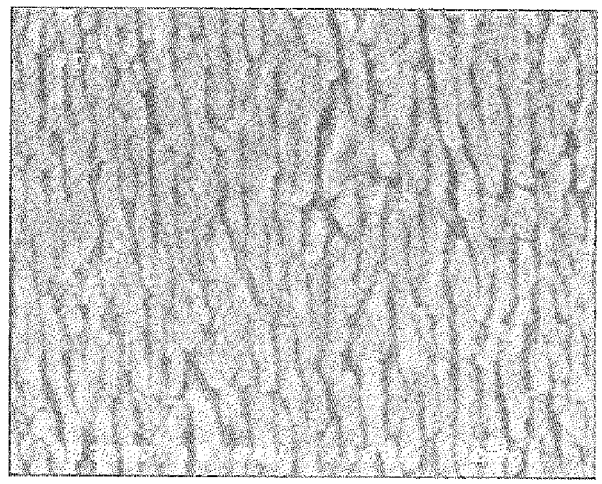
FIG. 41A is a SEM photograph of the surface of the bundle structure after 90 seconds of irradiation with an Ar ion beam.
Figure 41B:
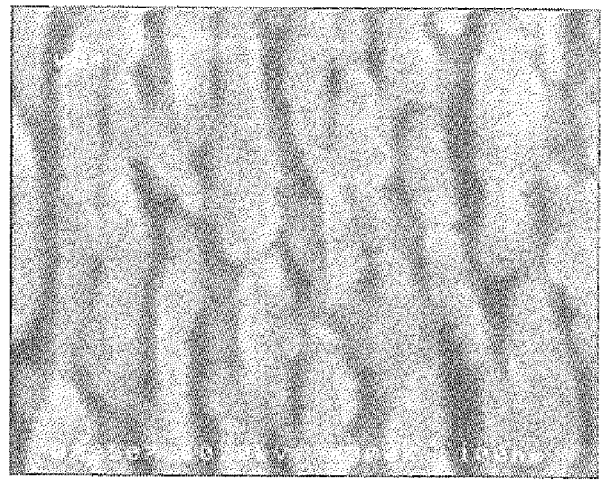
FIG. 41B is a SEM photograph blowing up part of FIG. 41A.
Figure 42:
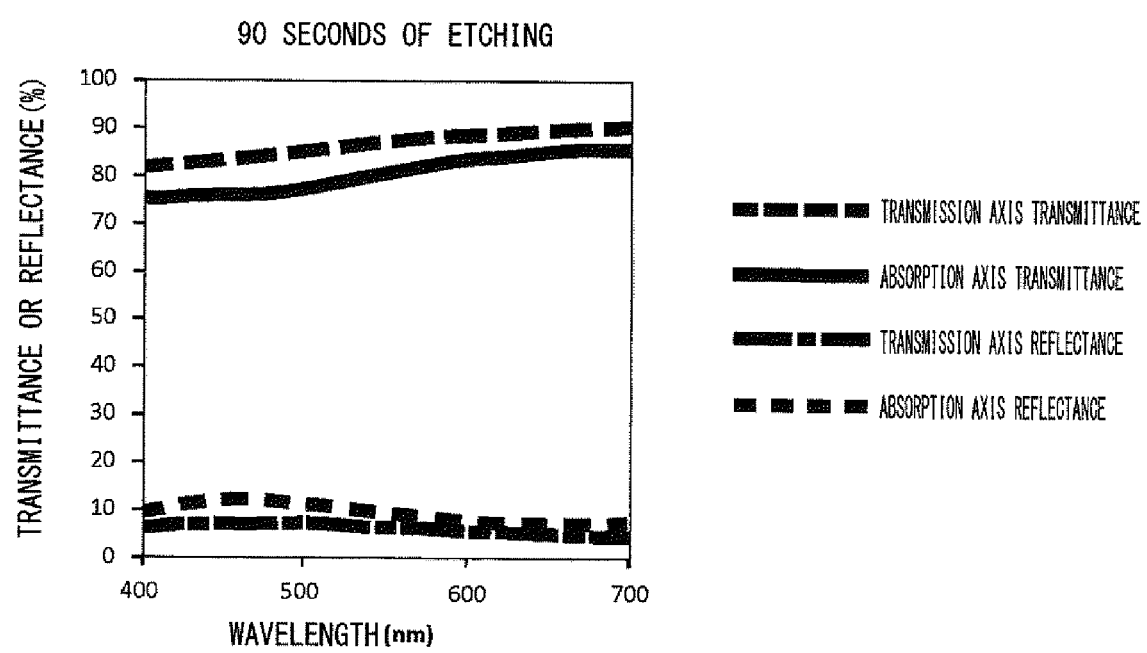
FIG. 42 is a graph indicating optical characteristics of the bundle structure after 90 seconds of irradiation with an Ar ion beam.

The bundle structure layer was reduced in a hydrogen reduction furnace at a hydrogen concentration of 7% at 400° C. for 1 hour to prepare a polarizing plate of Example 6. FIG. 39A is a SEM photograph of the surface of the bundle structure irradiated with an Ar ion beam for 0 second and FIG. 39B is a SEM photograph blowing up part of FIG. 39A. FIG. 40 is a graph indicating optical characteristics of the bundle structure irradiated with an Ar ion beam for 0 second. FIG. 41A is a SEM photograph of the surface of the bundle structure after 90 seconds of irradiation with an Ar ion beam, and FIG. 41B is a SEM photograph blowing up part of FIG. 41A. FIG. 42 is a graph indicating optical characteristics of the bundle structure after 90 seconds of irradiation with an Ar ion beam. The polarization property was measured by applying linearly polarized light parallel to the transmission axis or absorption axis.

The optical characteristics illustrated in FIGS. 40 and 42 indicate that the difference between the transmission axis transmittance and the absorption axis transmittance (in other words, contrast) can be increased by improving the straightness of the bundle structure.

REFERENCE SIGNS LIST

11: translucent substrate, 12: bundle structure layer, 13: absorption layer, 14: dielectric layer, 15: reflection layer, 22: upper bundle structure layer, 23: upper absorption layer, 32: bundle structure layer, 33: absorption layer, 42: bundle structure layer

The invention claimed is:
1. A polarizing plate comprising:
a translucent substrate that transmits light in a working band, wherein said translucent substrate has a flat surface;
a reflection layer disposed on the translucent substrate and arranged in a one-dimensional lattice at a pitch smaller than a wavelength of light in the working band;
a dielectric layer disposed on the reflection layer;
a bundle structure layer disposed on the dielectric layer and constituted by a columnar sheaf formed of at least one selected from a metal and a semiconductor; and
an absorption layer comprising a metal or a semiconductor disposed on the bundle structure layer,
wherein the reflection layer, the dielectric layer, the bundle structure layer, and the absorption layer have a same width, and
wherein the bundle structure layer has a structure in which two layers, formed of columnar sheaves and having deposition directions that differ 180 degrees from each other, are alternately stacked.

* * * * *